United States Patent
Zhang et al.

(10) Patent No.: US 11,812,465 B2
(45) Date of Patent: Nov. 7, 2023

(54) MIXED MODE OPERATION IN LOW POWER FREQUENCY HOPPING

(71) Applicant: QUALCOMM Incorporated, San Diego, CA (US)

(72) Inventors: Xiaoxia Zhang, San Diego, CA (US); Arumugam Chendamarai Kannan, San Diego, CA (US); Jing Sun, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 17/169,379

(22) Filed: Feb. 5, 2021

(65) Prior Publication Data
US 2022/0256590 A1 Aug. 11, 2022

(51) Int. Cl.
*H04W 74/00* (2009.01)
*H04L 5/00* (2006.01)
*H04W 8/24* (2009.01)
*H04W 74/08* (2009.01)

(52) U.S. Cl.
CPC ........ *H04W 74/008* (2013.01); *H04L 5/0012* (2013.01); *H04W 8/24* (2013.01); *H04W 74/0808* (2013.01)

(58) Field of Classification Search
CPC . H04W 74/008; H04W 8/24; H04W 74/0808; H04W 76/27; H04W 52/288; H04L 5/0012
See application file for complete search history.

(56) References Cited

U.S. PATENT DOCUMENTS

| 10,736,091 B2* | 8/2020 | Noh ................. H04L 5/0092 |
| 2017/0079011 A1* | 3/2017 | Kenney ............. H04W 72/042 |
| 2019/0261405 A1* | 8/2019 | Ang ................ H04W 72/1263 |

(Continued)

OTHER PUBLICATIONS

Ericsson: "Trigger Criteria for Power Headroom Reporting", 3GPP TSG-RAN WG1 #52bis, 3GPP Draft, R1-081535, 3rd Generation Partnership Project (3GPP), Mobile Competence Centre, 650, Route Des Lucioles, F-06921 Sophia-Antipolis Cedex, France, vol. RAN WG1, No. Shenzhen, China, Mar. 27, 2008, Mar. 27, 2008 (Mar. 27, 2008), 2 Pages, XP050109948, [retrieved on Mar. 27, 2008], Paragraph [02.1].

(Continued)

*Primary Examiner* — Mandish K Randhawa
(74) *Attorney, Agent, or Firm* — Holland & Hart LLP

(57) ABSTRACT

Methods, systems, and devices for wireless communications are described. User equipments (UEs) and base stations may communicate in low power modes. A base station may transmit, to a UE, a configuration of a first regulation operating mode for the UE. The first regulation operating mode may be associated with one or more of a first transmit power constraint, a first frequency hopping setting, or a first LBT setting. The base station may transmit downlink communications to the UE according to a second regulation operating mode, which may be different from the first regulation operating mode. the UE may then perform uplink transmissions to the base station according to the first regulation operating mode. In some cases, the UE may also receive signaling advertising the second regulation operating mode of the base station.

30 Claims, 15 Drawing Sheets

(56) References Cited

U.S. PATENT DOCUMENTS

| | | | |
|---|---|---|---|
| 2020/0068608 A1* | 2/2020 | Ye | H04W 72/048 |
| 2021/0058856 A1* | 2/2021 | Qi | H04W 48/16 |
| 2022/0078872 A1* | 3/2022 | Shrestha | H04W 76/30 |
| 2022/0159580 A1* | 5/2022 | Su | H04W 72/0446 |
| 2022/0183079 A1* | 6/2022 | Ouchi | H04W 74/0841 |

OTHER PUBLICATIONS

International Search Report and Written Opinion—PCT/US2022/070500—ISA/EPO—dated May 17, 2022.

Qualcomm Proprietary: "Enhancements for Rel-15 eMTC/NB-IoT", 3GPP RAN #74, 3GPP Draft, RP-162126 Evolution of NB-IOT and EMTC, 3rd Generation Partnership Project (3GPP), Mobile Competence Centre, 650, Route Des Lucioles, F-06921 Sophia-Antipolis Cedex, France, Dec. 4, 2016 (Dec. 4, 2016), 8 Pages, XP051183555, Retrieved from the Internet: URL : http://www.3gpp.org/ftp/Meetings_3GPP_SYNC/RAN/Docs/, [retrieved on Dec. 4, 2016], Slides 2-4, 6.

\* cited by examiner

MIXED MODE OPERATION IN LOW POWER FREQUENCY HOPPING

FIELD OF TECHNOLOGY

The following relates to wireless communications, including mixed mode operation in low power frequency hopping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

UEs and base stations may operate in lower power modes based on capabilities of the devices and environmental conditions, include whether the device is inside or outside. Low power modes may include limited frequency bandwidth usage, or guidelines on listen-before-talk (LBT) performance considerations.

SUMMARY

The described techniques relate to improved methods, systems, devices, and apparatuses that support mixed mode operation in low power frequency hopping. Generally, the described techniques provide for user equipments (UEs) and base stations communicating in low power modes. A base station may transmit, to a UE, a configuration of a first regulation operating mode for the UE. The first regulation operating mode may be associated with one or more of a first transmit power constraint, a first frequency hopping setting, or a first LBT setting. The base station may transmit downlink communications to the UE according to a second regulation operating mode, which may be different from the first regulation operating mode. the UE may then perform uplink transmissions to the base station according to the first regulation operating mode. In some cases, the UE may also receive signaling advertising the second regulation operating mode of the base station, the second regulation operating mode may also be associated with one or more of a second transmit power constraint, a second frequency hopping setting, or a second LBT setting.

A method for wireless communication at a UE is described. The method may include receiving from the base station a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode, receiving downlink transmissions from the base station according to the second regulation operating mode, and performing uplink transmissions to the base station according to the first regulation operating mode.

An apparatus for wireless communication at a UE is described. The apparatus may include a processor, memory coupled with the processor, and instructions stored in the memory. The instructions may be executable by the processor to cause the apparatus to receive from the base station a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode, receive downlink transmissions from the base station according to the second regulation operating mode, and perform uplink transmissions to the base station according to the first regulation operating mode.

Another apparatus for wireless communication at a UE is described. The apparatus may include means for receiving from the base station a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode, means for receiving downlink transmissions from the base station according to the second regulation operating mode, and means for performing uplink transmissions to the base station according to the first regulation operating mode.

A non-transitory computer-readable medium storing code for wireless communication at a UE is described. The code may include instructions executable by a processor to receive from the base station a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode, receive downlink transmissions from the base station according to the second regulation operating mode, and perform uplink transmissions to the base station according to the first regulation operating mode.

Some examples of the method, apparatuses, and non-transitory computer-readable medium described herein may further include operations, features, means, or instructions for receiving signaling advertising the second regulation operating mode of a base station, the second regulation operating mode associated with one or more of a second transmit power constraint, a second frequency hopping setting, or a second listen-before-talk setting.

Some examples of the method, apparatuses, and non-transitory computer-readable medium described herein may further include operations, features, means, or instructions for using a default regulation operating mode to transmit to the base station prior to receiving the configuration of the first regulation operating mode for the UE, where the default regulation operating mode may be different from the first regulation operating mode.

In some examples of the method, apparatuses, and non-transitory computer-readable medium described herein, frequency hopping may be enabled for the default regulation operating mode.

Some examples of the method, apparatuses, and non-transitory computer-readable medium described herein may further include operations, features, means, or instructions for transmitting signaling indicating a listen-before-talk capability of the UE to the base station, where receiving the configuration of the first regulation operating mode for the UE may be based on the listen-before-talk capability of the UE.

In some examples of the method, apparatuses, and non-transitory computer-readable medium described herein, transmitting the signaling indicating the listen-before-talk capability of the UE may include operations, features, means, or instructions for transmitting a radio resource control (RRC) message including the listen-before-talk capability of the UE following a RRC connection setup procedure between the base station and the UE.

In some examples of the method, apparatuses, and non-transitory computer-readable medium described herein, transmitting the signaling indicating the listen-before-talk capability of the UE may include operations, features, means, or instructions for transmitting a random access preamble to the base station in connection with a random access procedure, where the listen-before-talk capability of the UE may be indicated by one or more of: a sequence of the random access preamble or a random access channel opportunity used to transmit the random access preamble.

Some examples of the method, apparatuses, and non-transitory computer-readable medium described herein may further include operations, features, means, or instructions for transmitting a recommendation for the first regulation operating mode to the base station, where receiving the configuration of the first regulation operating mode for the UE may be in response to the recommendation or request.

In some examples of the method, apparatuses, and non-transitory computer-readable medium described herein, receiving the downlink transmissions from the base station according to the second regulation operating mode may include operations, features, means, or instructions for receiving the downlink transmissions using a first band that may be wider than a second band used to transmit the uplink transmissions.

In some examples of the method, apparatuses, and non-transitory computer-readable medium described herein, performing the uplink transmissions to the base station according to the first regulation operating mode may include operations, features, means, or instructions for selectively enabling or disabling frequency hopping based on the configuration of the first regulation operating mode.

In some examples of the method, apparatuses, and non-transitory computer-readable medium described herein, performing the uplink transmissions to the base station according to the first regulation operating mode may include operations, features, means, or instructions for using frequency hopping for the uplink transmissions while frequency hopping may be disabled for the downlink transmissions.

In some examples of the method, apparatuses, and non-transitory computer-readable medium described herein, and the method, apparatuses, and non-transitory computer-readable medium may include further operations, features, means, or instructions for the LPI mode or a VLP mode with frequency hopping.

In some examples of the method, apparatuses, and non-transitory computer-readable medium described herein, the second regulation operating mode includes a VLP mode without frequency hopping and the first regulation operating mode includes a VLP mode with frequency hopping.

A method for wireless communication at a base station is described. The method may include transmitting, to a UE a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode, transmitting downlink transmissions to the UE according to the second regulation operating mode, and receiving uplink transmissions from the UE according to the first regulation operating mode.

An apparatus for wireless communication at a base station is described. The apparatus may include a processor, memory coupled with the processor, and instructions stored in the memory. The instructions may be executable by the processor to cause the apparatus to transmit, to a UE a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode, transmit downlink transmissions to the UE according to the second regulation operating mode, and receive uplink transmissions from the UE according to the first regulation operating mode.

Another apparatus for wireless communication at a base station is described. The apparatus may include means for transmitting, to a UE a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode, means for transmitting downlink transmissions to the UE according to the second regulation operating mode, and means for receiving uplink transmissions from the UE according to the first regulation operating mode.

A non-transitory computer-readable medium storing code for wireless communication at a base station is described. The code may include instructions executable by a processor to transmit, to a UE a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode, transmit downlink transmissions to the UE according to the second regulation operating mode, and receive uplink transmissions from the UE according to the first regulation operating mode.

Some examples of the method, apparatuses, and non-transitory computer-readable medium described herein may further include operations, features, means, or instructions for transmitting signaling advertising the second regulation operating mode of the base station, the second regulation operating mode associated with one or more of a second transmit power constraint, a second frequency hopping setting, or a second listen-before-talk setting.

Some examples of the method, apparatuses, and non-transitory computer-readable medium described herein may further include operations, features, means, or instructions for receiving transmissions from the UE according to a default regulation operating mode prior to transmitting the configuration of the first regulation operating mode to the UE, where the default regulation operating mode may be different from the first regulation operating mode.

In some examples of the method, apparatuses, and non-transitory computer-readable medium described herein, frequency hopping may be enabled for the default regulation operating mode.

Some examples of the method, apparatuses, and non-transitory computer-readable medium described herein may further include operations, features, means, or instructions for receiving, from the UE, signaling indicating a listen-before-talk capability of the UE, where transmitting the configuration of the first regulation operating mode for the UE may be based on the listen-before-talk capability of the UE.

In some examples of the method, apparatuses, and non-transitory computer-readable medium described herein, receiving the signaling indicating the listen-before-talk capability of the UE may include operations, features, means, or instructions for receiving a RRC message including the listen-before-talk capability of the UE following a RRC connection setup procedure between the base station and the UE.

In some examples of the method, apparatuses, and non-transitory computer-readable medium described herein, receiving the signaling indicating the listen-before-talk capability of the UE may include operations, features, means, or instructions for receiving a random access preamble from the UE in connection with a random access procedure, where the listen-before-talk capability of the UE may be indicated by one or more of: a sequence of the random access preamble or a random access channel opportunity used to transmit the random access preamble.

Some examples of the method, apparatuses, and non-transitory computer-readable medium described herein may further include operations, features, means, or instructions for receiving a recommendation for the first regulation operating mode from the UE, where transmitting the configuration of the first regulation operating mode for the UE may be in response to the recommendation or request.

In some examples of the method, apparatuses, and non-transitory computer-readable medium described herein, transmitting the downlink transmissions to the UE according to the second regulation operating mode may include operations, features, means, or instructions for transmitting the downlink transmissions using a first band that may be wider than a second band used to transmit the uplink transmissions.

In some examples of the method, apparatuses, and non-transitory computer-readable medium described herein, receiving the uplink transmissions from the UE according to the first regulation operating mode may include operations, features, means, or instructions for selectively enabling or disabling frequency hopping based on the configuration of the first regulation operating mode.

In some examples of the method, apparatuses, and non-transitory computer-readable medium described herein, receiving the uplink transmissions from the UE according to the first regulation operating mode may include operations, features, means, or instructions for using frequency hopping to receive the uplink transmissions while frequency hopping may be disabled for the downlink transmissions.

Some examples of the method, apparatuses, and non-transitory computer-readable medium described herein may further include operations, features, means, or instructions for transmitting, to a second UE a configuration of a third regulation operating mode for the UE, the third regulation operating mode associated with a third transmit power constraint, a third frequency hopping setting, and a third listen-before-talk setting, where the third regulation operating mode may be different from the first regulation operating mode and the second regulation operating mode.

In some examples of the method, apparatuses, and non-transitory computer-readable medium described herein, and the method, apparatuses, and non-transitory computer-readable medium may include further operations, features, means, or instructions for the LPI mode or a VLP mode with frequency hopping.

In some examples of the method, apparatuses, and non-transitory computer-readable medium described herein, the second regulation operating mode includes a VLP mode without frequency hopping and the first regulation operating mode includes a VLP mode with frequency hopping.

DETAILED DESCRIPTION

Figure 1:
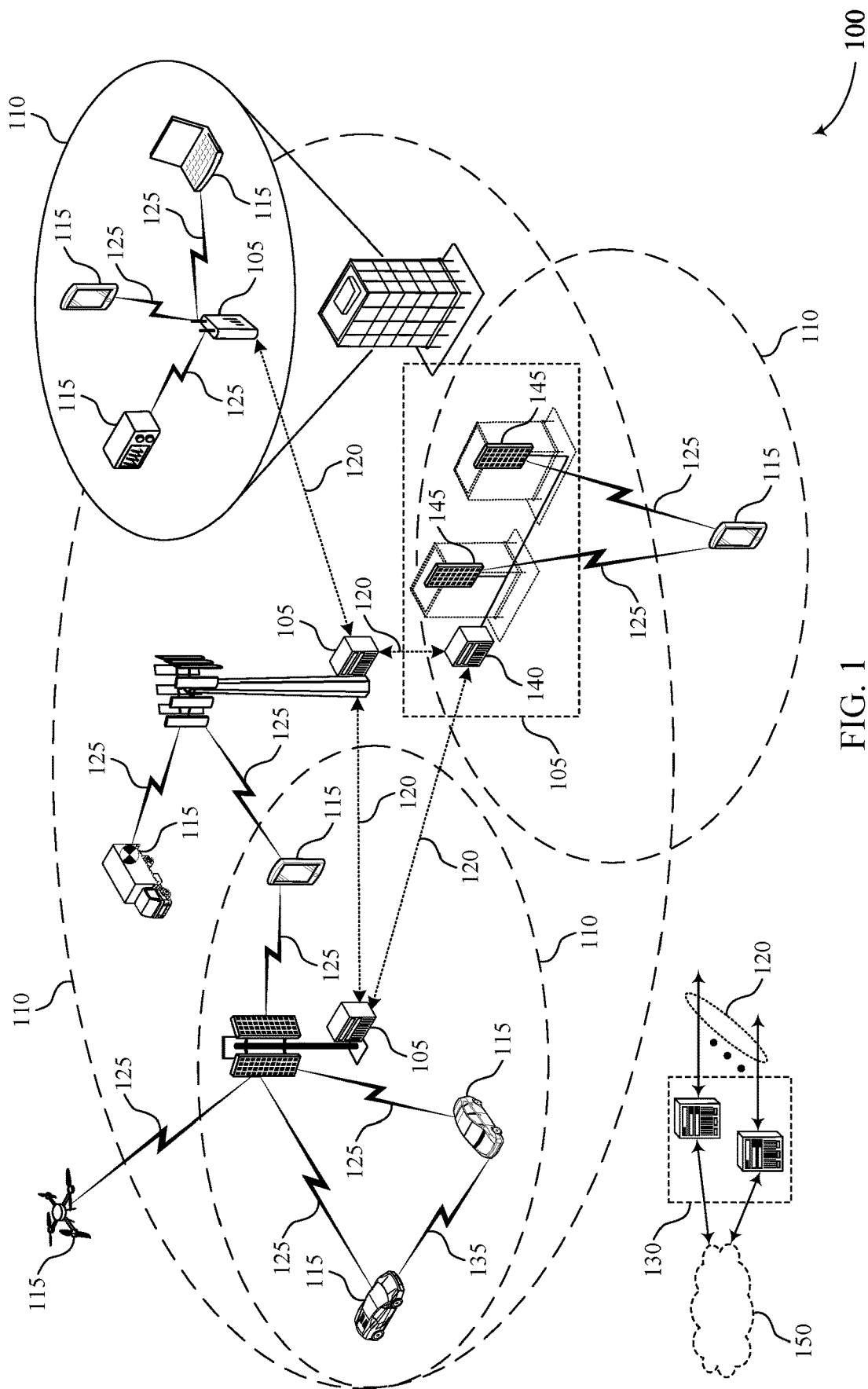
FIG. 1 illustrates an example of a wireless communications system that supports mixed mode operation in low power frequency hopping in accordance with aspects of the present disclosure.

One or more user equipments (UEs) may communicate with a base station in a wireless communications system. UEs may be client devices and base stations may also be access points (APs) The UEs may operate according to different power modes.

A power or transmit mode defined, adopted, or enforced by a regulatory body, such as the European Electronic Communications Committee (ECC) or the Federal Communications Commission (FCC) is referred to here as a "regulatory operating mode." A regulatory operating mode may establish constraints (such as transmit power constraints, listen-before-talk constraints, and/or frequency hopping requirements) associated with operating at different power levels. Non-exclusive examples of such regulatory operating modes include a very-low power (VLP) mode defined by the ECC for use in indoor and outdoor device operation, and a low power indoor (LPI) mode defined by the ECC for use in indoor device operation. VLP modes and LPI modes may include certain operating thresholds, including effective isotropic radiated power (EIRP) thresholds in decibel milliwatts (dBm) or dBm per megahertz (MHz).

In some examples, a VLP device may be a portable device, that operates in the frequency band of 5945-6425 MHz. A VLP device may use a spectrum sharing mechanism. The VLP mode may also include a maximum mean EIRP for in band emissions of 14 dBm, a maximum mean EIRP density for in-band emissions of 1 dBm/MHz, and a maximum mean EIRP density for out-of-band emissions below 5325 MHz of −45 dBm/MHz.

In some examples, a LPI device may include an AP (e.g., a base station) that is supplied power from a wired connected, has an integrated antenna, and may not be battery powered. A LPI client device (e.g., UE) that is connected to a LPI AP or another LPI client device, and may or may not be battery powered. A LPI device may operate in 5945-6425 MHz. A LPI device may use a spectrum sharing mechanism. The LPI mode may also include a maximum mean EIRP for in band emissions of 23 dBm, a maximum mean EIRP density for in-band emissions of 10 dBm/MHz, and a maximum mean EIRP density for out-of-band emissions below 5325 MHz of −22 dBm/MHz.

The mean EIRP may refer to the EIRP during a transmission burst, which may correspond to the highest power (e.g., when power control is implemented). A device operating in narrowband may mean that the device operate in channel bandwidths below 20 MHz. Narrowband devices may also use a frequency hopping mechanism based on a number of hop channels (e.g., 15 hop channels) to operate at a PSD value of above a threshold (e.g., 1 dBm/MHz).

Further, the LPI mode may allow for medium access following standard LBT procedures. In another example, the VLP mode may allow for medium access without LBT, or with relaxed LBT requirements, if the UE transmits using frequency hopping at a reduced maximum EIRP constraint and a reduced bandwidth. Relaxed LBT requirements for VLP mode may apply in cases where the UE performs frequency hopping. A relaxed LBT procedure may include a wireless device performing different types of LBTs for a transmission. For example, a UE may not need to perform an enhanced clear channel assessment (eCCA) (e.g., a category 4 LBT). Rather, the UE may perform a single shot LBT (e.g., a category 2 LBT). Additionally or alternatively, a UE may perform an eCCA with a smaller contention window than a traditional eCCA, but with a longer transmission duration, when compared to the case when the UE does not perform frequency hopping (e.g., when the UE is not in a VLP mode) A UE may also perform a CCA with a relaxed energy detection threshold (e.g., a higher or larger energy detection threshold), when the UE performs frequency hopping. Generally, a relaxed LBT may mean that when the UE performs frequency hopping (e.g., in a VLP mode), the UE may use a smaller contention window, longer transmission duration, or a different (e.g., larger) energy threshold, when compared to the case when the UE does not perform frequency hopping.

A UE may be able to operate according to a VLP or LPI mode based on UE capabilities. However, it may be difficult for a base station or AP to use a VLP or LPI mode, as the base station may use a more robust downlink channel, which may include higher power and wider bandwidth usage.

One issue with current cellular systems is that a UE and a base station are constrained to communicate with each other using the same regulation operating mode. Unfortunately, as noted above, a regulation operating mode that works well for the UE may not work well for the base station.

Thus, the present disclosure proposes techniques for enabling a UE and a base station to operate according to a mixed mode operation. In a mixed mode operation, a base station or an AP may operate in one regulation operating mode (e.g., VLP with LBT and no frequency hopping, or LPI) for downlink transmissions, and may receive uplink transmissions from a UE or a client device operating in a different regulation operating mode (e.g., VLP with frequency hopping and no LBT, or LPI). Additionally, one or more UEs communicating with a same base station may operate according to different regulation operating modes. For example, one UE may perform uplink transmissions while operating in a LPI mode, and a second UE may perform uplink transmissions to the same base station while operating in a VLP mode with frequency hopping and LBT.

In order to operate in a mixed mode operation, the base station may configure one or more UEs with a regulation operating mode. In some cases, different UEs may be configured by the same base station with different regulation operating modes. The base station may additionally announce or advertise the regulation operating mode selected for downlink communications by the base station. The base station may transmit downlink communications to the one or more UEs according to the regulation operating mode of the base station, and the one or more UEs may transmit uplink communications to the base station according to the configured regulation operating mode of each UE.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to mixed mode operation in low power frequency hopping.

FIG. 1 illustrates an example of a wireless communications system 100 that supports mixed mode operation in low power frequency hopping in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

UEs 115 and base stations 105 may communicate in low power regulation operating modes, such as LPI or VLP modes. A base station 105 may transmit, to a UE 115, a configuration of a first regulation operating mode selected for the UE 115 by the base station. The first regulation operating mode may be associated with one or more of a first transmit power constraint, a first frequency hopping setting, or a first LBT setting. The base station 105 may transmit downlink communications to the UE 115 according to a second regulation operating mode, which may be different from the first regulation operating mode. The UE 115 may then perform uplink transmissions to the base station according to the first regulation operating mode. In some cases, the UE 115 may also receive signaling advertising the second regulation operating mode of the base station, the second regulation operating mode may also be associated with one or more of a second transmit power constraint, a second frequency hopping setting, or a second LBT setting.

Figure 2:
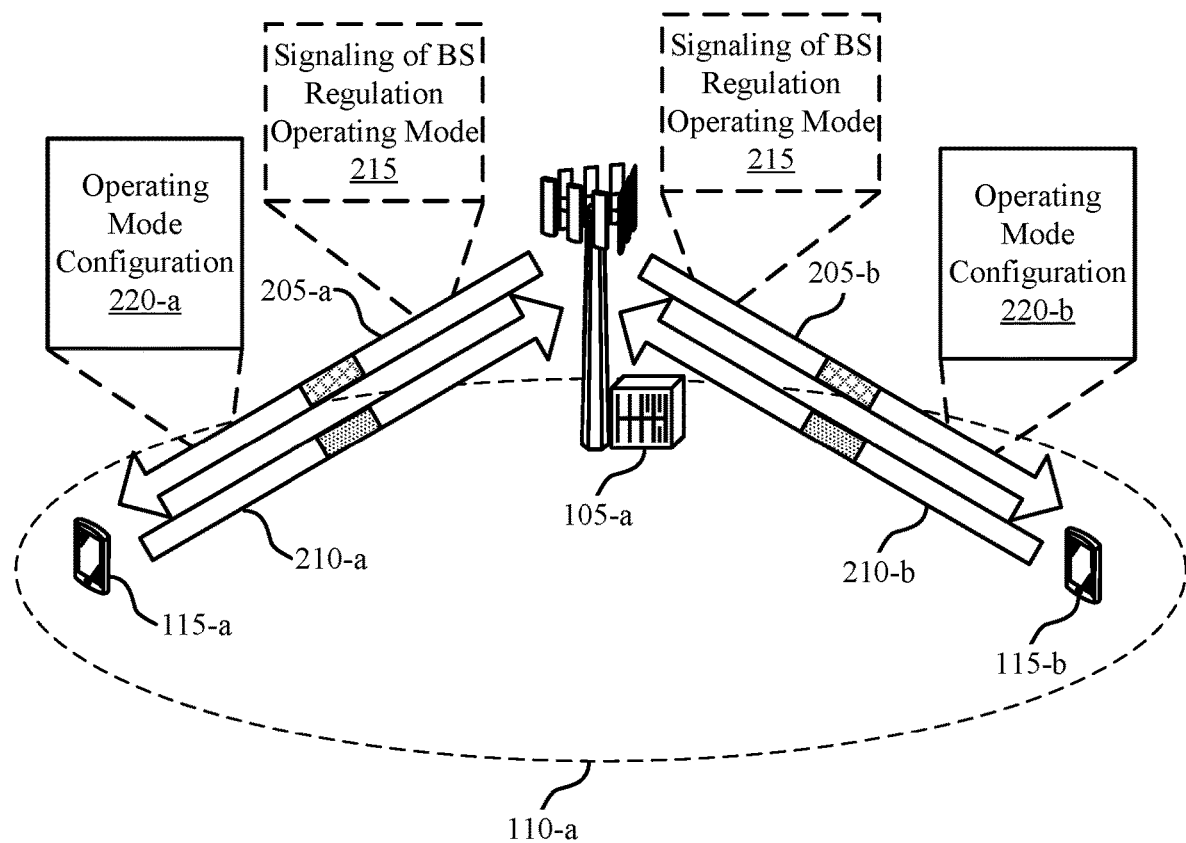
FIG. 2 illustrates an example of a wireless communications system that supports mixed mode operation in low power frequency hopping in accordance with aspects of the present disclosure.

FIG. 2 illustrates an example of a wireless communications system 200 that supports mixed mode operation in low power frequency hopping in accordance with aspects of the present disclosure. Wireless communications system 200 may implement aspects of wireless communications system 100. UE 115-*a* and UE 115-*b* may be examples of a UE 115 as described with respect to FIG. 1. UEs 115 may also be examples of client devices. Base station 105-*a* may be an example of a base station 105 as described with respect to FIG. 1. Base stations 105 may also be examples of APs. Base station 105-*a* may communicate with one or more UEs 115, such as UE 115-*a* and UE 115-*b* within coverage area 110-*a*.

Communication devices including UEs 115 and base stations 105 may operate according to one or more low power modes. The low power modes may include a VLP mode and an LPI mode. a VLP mode may also a device, such as a UE 115 or a base station 105, to operate without LBT procedures, or with a relaxed LBT procedure, with frequency hopping. In this operating mode, a device with licensed operation may be deployed directly without unlicensed implementation, or with a relaxed LBT implementation. The relaxed LBT procedure may include a UE 115 performing a category 2 LBT rather than a category 4 LBT (e.g., eCCA) or a different version of a category 4 LBT. The different version of the category 4 LBT may include a smaller contention window or a longer duration transmission when compared to a case when the UE 115 does not perform frequency hopping. The UE may also perform a CCA with a relaxed energy detection threshold (e.g., a higher or larger energy detection threshold).

For example, a VLP mode may be used for a UE 115 with reduced capability, and which only supports narrowband frequency hopping. A VLP mode may also be applicable for an industrial Internet of things (IIOT) UE that is capable of wideband operation, but which may use a narrowband transmission bandwidth for some small packet transmission.

For example, base station 105-*a* may operate according to LPI mode for indoor operation. Base station 105-*a* may also operate according to VLP mode without frequency hopping for outdoor portable operation. In these cases, base station 105-*a* may support wideband transmission for system capacity (e.g., in cases where the system capacity would not work for a narrowband hopping mode).

In many cases, the regulation operating mode of the UEs 115 may depend on the regulation operating mode of the base station 105. UEs 115 may operate in a LPI mode when connected with base station 105-a operating in a LPI mode. UEs 115 may also operate in a VLP mode when connected to a base station 105 operating in a VLP mode. UEs 115 may also operate in a VLP mode with frequency hopping configured.

However, UEs 115 and base station 105 may also operate according to a mixed mode operation. In these cases, UEs 115-a and 115-b may operate according to different regulation operating modes than base station 105-a. Additionally, UEs 115-a and 115-b may each operate according to different regulation operating modes. For example, base station 105-a may operate in a LPI mode in an indoor operation, or a VLP mode for outdoor operation, without frequency hopping. In the cases of base station 105-a operating in a LPI mode, UEs 115 may operate either in LPI mode or in VLP mode with frequency hopping. Additionally, UE 115-a could operate in a LPI mode for a first amount of time (e.g., starting at T0), and then operate in a VLP mode with frequency hopping at a second time (e.g., starting at T1). Base station 105-a may also operate in a VLP mode. In these cases, each UE 115 may operate in a VLP mode with or without frequency hopping. UE 115-a or UE 115-b may also operate in a VLP mode without frequency hopping at time T0 or with frequency hopping at a later time (e.g., T1). The operation mode of UEs 115 may be based on the traffic type of the UE 115, UE capability, geometry, or other parameters.

Base station 105-a may transmit operating mode configuration 220 to UEs 115. Operating mode configuration 220 may include an indication of a regulation operating mode, such as LPI or VLP with or without frequency hopping, for the UE 115 to use for uplink transmissions. Base station 105-a may transmit operating mode configuration 220-a to UE 115-a over downlink channel 205-a. Base station 105-a may transmit operating mode configuration 220-b to UE 115-b over downlink channel 205-b. Operating mode configurations 220-a and 220-b may include different regulation operating modes for each UE 115-a and 115-b.

The indicated operating modes in operating mode configurations 220 may indicate for the UE 115 to use the mode when transmitting uplink transmissions 230 in uplink channels 210. For example UE 115-a may transmit uplink transmissions 230 in channel 210-a according to operating mode configuration 220-a, and UE 115-b may transmit uplink transmissions 230 in channel 210-b according to operating mode configuration 220-a.

In some cases, base station 105-a may also transmit signaling of a regulation operating mode 215 used by the base station 105-a for downlink transmissions 225 over channels 205-a and 205-b.

Thus, base station 105-a may operate according to a first regulation operating mode, which may be different from the second regulation operating modes indicated to UEs 115 in operating mode configurations 220. Therefore, UEs 115 may receive downlink transmissions 225 from base station 105-a in a wideband frequency, while transmitting uplink transmissions 230 to base station 105-a in a narrowband frequency, with or without frequency hopping.

In some cases, UEs 115 may request or recommend an operating mode, and may transmit the recommendation to base station 105-a. The base station 105-a may then determine the regulation operating mode for the UE 115 based on the recommendation (e.g., including or not including the requested mode), and may transmit operating mode configuration 220-a.

When base station 105-a operates in a LPI mode, base station 105-a may switch a UE 115 between a LPI mode and a VLP mode with frequency hopping. When base station 105-a operates in a VLP mode, base station 105-a may switch a UE 115 between a VLP mode without frequency hopping and a VLP mode with frequency hopping.

Before a UE 115 received an indication of the operating mode configuration 220, the UE may operate according to a VLP mode with frequency hopping. This may support UEs with different implementation capabilities.

Additionally or alternatively, UEs 115-a and 115-b may indicate a capability of the UE 115, and base station 105-a may transmit operating mode configurations 220 based on the capability of the UE 115. UEs 115 may indicate a capability to perform LBT (e.g., regular LBT, relaxed LBT, or no LBT) to base station 105-a. UEs 115 may transmit the capability indication to base station 105-a after a radio resource control (RRC) connection setup. UEs 115 may also transmit the capability indication before the connection setup, such as during a random access channel (RACH) procedure. For example, UE 115-a may indicate a LBT capability using different physical RACH (PRACH) sequences, or different RACH occasions (ROs) to indicate the capability of UE 115-a, including a LBT capability.

Thus, base station 105-a may indicate operating mode configurations 220 to UEs 115. In some cases, operating mode configurations 220 may be based on recommendations from UEs 115, or based on capabilities of UEs 115. Base station 105-a may also transmit signaling of the regulation operating mode 215 used by base station 105-a to transmit downlink transmissions 225. UEs 115 may use operating mode configurations 220 to transmit uplink transmissions 230 to base station 105-a. Therefore, base stations 105 and UEs 115 may operate in a mixed-mode configuration, operating according to different regulation operating modes, and transmitting and receiving communications efficiently.

For example, base station 105-a may operate in a LPI mode. UE 115-a may operate in an LPI mode, and UE 115-b may operate in a VLP mode with hopping. UE 115-a may also operate according to a LPI mode at first time, T0, and UE 115-b may operate in a VLP mode with frequency hopping at second time, T1.

In another example, base station 105-a may operate in a VLP mode without frequency hopping. UE 115-a may operate in a VLP mode without frequency hopping, and UE 115-b may operate in a VLP mode with frequency hopping. UE 115-a may also operate in a VLP mode without frequency hopping at one time (e.g., T0), and UE 115-be may operate in a VLP mode with frequency hopping at a second time (e.g., T1).

Figure 3:
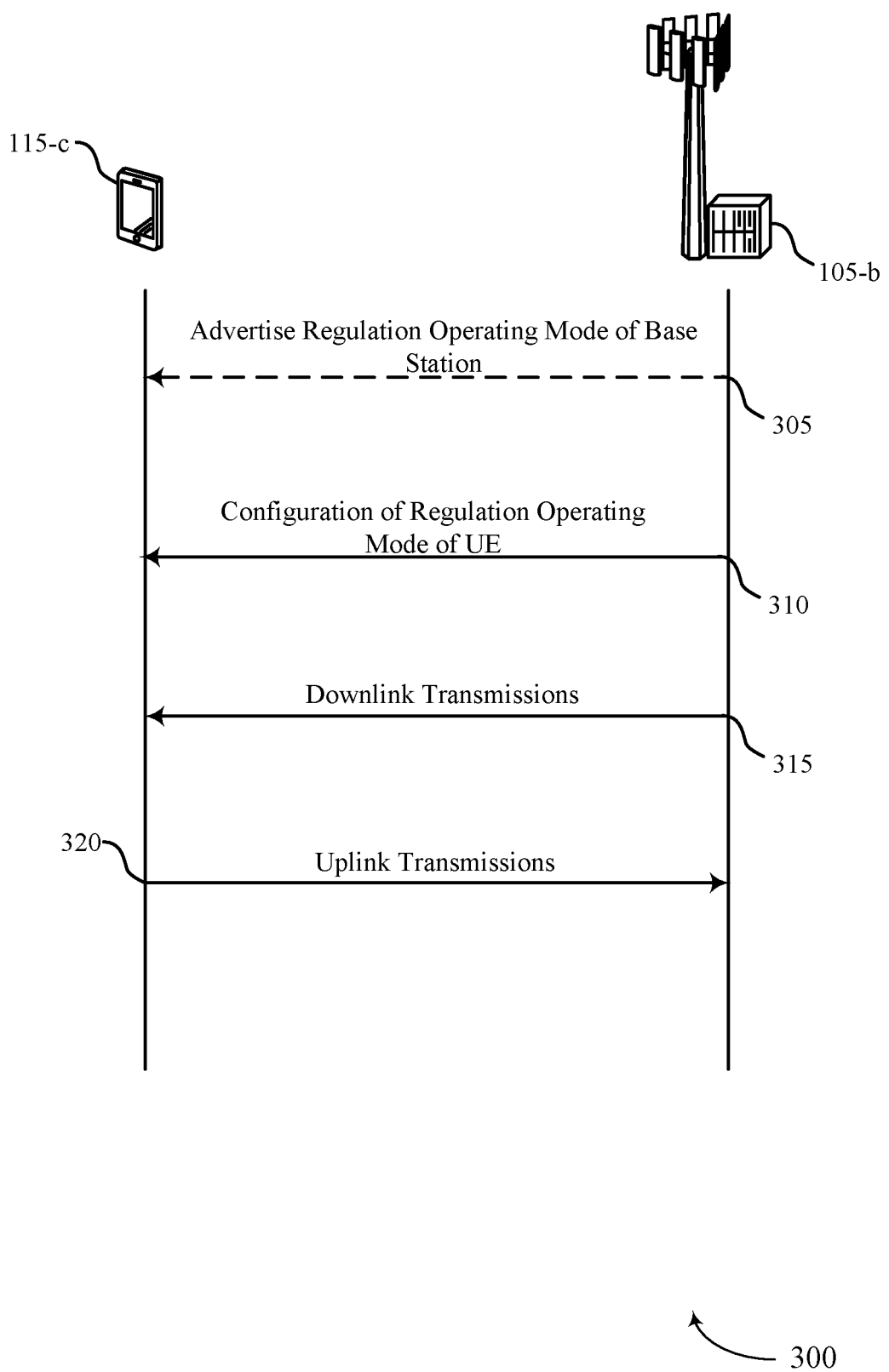
FIG. 3 illustrates an example of a process flow that supports mixed mode operation in low power frequency hopping in accordance with aspects of the present disclosure.

FIG. 3 illustrates an example of a process flow 300 that supports mixed mode operation in low power frequency hopping in accordance with aspects of the present disclosure. Process flow 300 may implement aspects of wireless communications systems 100 and 200. Process flow 300 includes UE 115-c, which may be an example of UEs 115 as described with respect to FIGS. 1 and 2. Process flow 300 also includes base station 105-b, which may be examples of base station 105 as described with respect to FIGS. 1 and 2. UE 115-c and base station 105-b may communicate while operating in a type of low power mode, including VLP or LPI.

In some cases, at 305, base station 105-b may transmit signaling advertising the regulation operating mode of base station 105-b. The regulation operating mode of base station 105-b may be associated with one or more of a transmit power constraint for base station 105-b, a frequency hopping setting for base station 105-b, or a LBT setting for base station 105-b. The regulation operating mode of the base station may be different from a regulation operating mode of UE 115-c.

At 310, UE 115-c may receive, from base station 105-b, a configuration of a regulation operating mode for UE 115-c. The regulation operating mode of UE 115-c may be associated with one or more of a transmit power constraint for UE 115-c, a frequency hopping setting for UE 115-c, or a LBT setting for UE 115-c. The regulation operating mode of UE 115-c may be different from a regulation operating mode of base station 105-b.

In some cases, base station 105-b may also transmit, to another UE 115 (not shown), a third regulation operating mode for another UE 115. The third regulation operating mode may be associated with a third transmit power constraint, a third frequency hopping setting, and a third LBT setting. The third regulation operating mode may be different from the regulation operating mode of UE 115-c and the second regulation operating mode of base station 105-b.

In some cases, UE 115-c may transmit signaling indicating a LBT capability of UE 115-c to base station 105-b. UE 115-c may receive the configuration of the regulation operating mode for UE 115-c based on the LBT capability of UE 115-c. In some cases, UE 115-c may transmit a RRC message indicating the LBT capability of UE 115-c following a RRC setup procedure between base station 105-b and UE 115-c. In other cases, UE 115-c may transmit a random access preamble to base station 105-b in connection with a random access procedure. UE 115-c may indicate the LBT capability by one ore more of a sequence of the random access preamble or a random access channel opportunity used to transmit the random access preamble.

In some cases, UE 115-c may transmit a recommendation for the regulation operating mode of UE 115-c to base station 105-b. UE 115-c may receive the configuration of the regulation operating mode for UE 115-c in response to the recommendation or request.

UE 115-c may initially operate using a default regulation operating mode to transmit to base station 105-b prior to receiving the configuration of the regulation operating mode for UE 115-c. The default regulation operating mode may be different from the regulation operating mode indicated at 310.

At 315, UE 115-c may receive downlink transmissions from base station 105-b according to the regulation operating mode of base station 105-b. UE 115-c may receive the downlink transmissions using a first band that is wider than a second band that may be used to transmit uplink communications.

At 320, UE 115-c may perform uplink transmissions to base station 105-b according to the regulation operating mode of UE 115-c. UE 115-c may selectively enable or disable frequency hopping based on the configuration of the regulation operating mode of UE 115-c. UE 115-c may use frequency hopping for the uplink transmissions while frequency hopping is disabled for the downlink transmissions.

In some cases, the regulation operating mode used by base station 105-b is a LPI mode, and the regulation operating mode used by a UE 115 may include one or more of the LPI mode or a VLP mode with frequency hopping. In other cases, the regulation operating mode used by base station 105-b may include a VLP mode without frequency hopping, and the regulation operating mode used by a UE 115 may include a VLP mode with frequency hopping.

Figure 4:
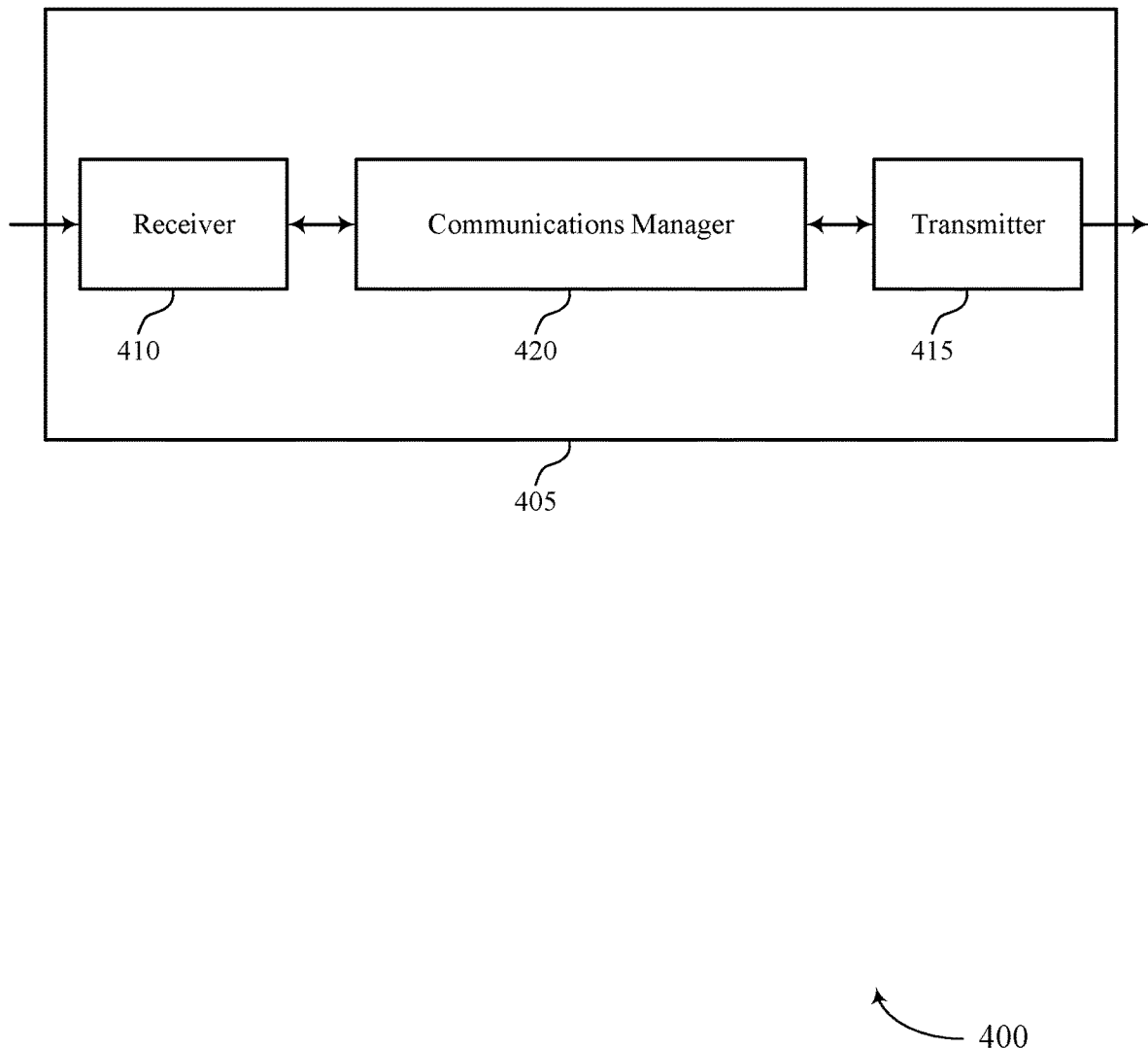
FIGS. 4 and 5 show block diagrams of devices that support mixed mode operation in low power frequency hopping in accordance with aspects of the present disclosure.

FIG. 4 shows a block diagram 400 of a device 405 that supports mixed mode operation in low power frequency hopping in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to mixed mode operation in low power frequency hopping). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to mixed mode operation in low power frequency hopping). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of mixed mode operation in low power frequency hopping as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving from a base station a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode. The communications manager 420 may be configured as or otherwise support a means for receiving downlink transmissions from the base station according to the second regulation operating mode. The communications manager 420 may be configured as or otherwise support a means for performing uplink transmissions to the base station according to the first regulation operating mode.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for efficient communications operation in low power systems. Mixed mode power operations between devices may provide further versatility in communications between devices.

Figure 5:
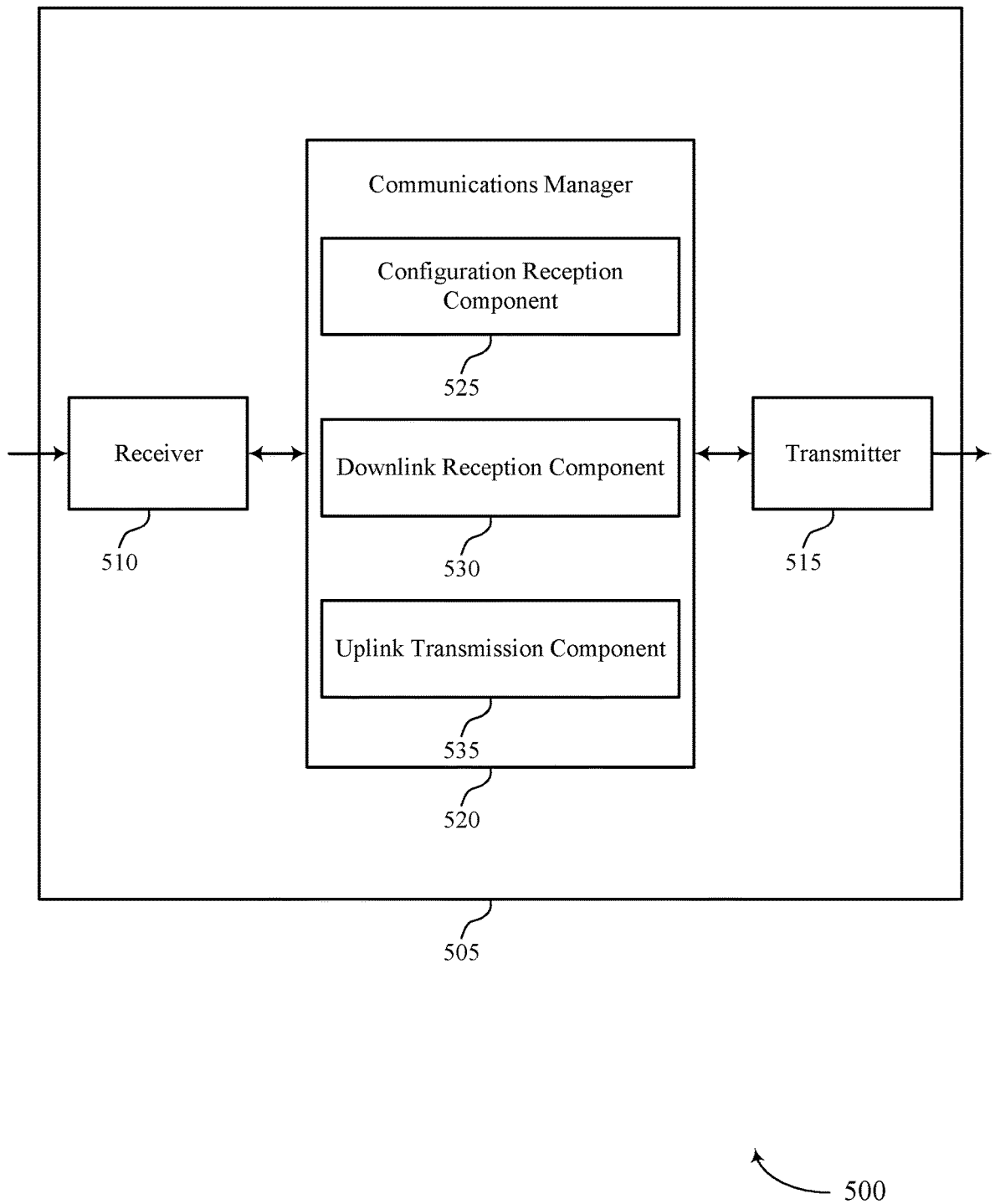

FIG. 5 shows a block diagram 500 of a device 505 that supports mixed mode operation in low power frequency hopping in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to mixed mode operation in low power frequency hopping). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to mixed mode operation in low power frequency hopping). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of mixed mode operation in low power frequency hopping as described herein. For example, the communications manager 520 may include a configuration reception component 525, a downlink reception component 530, an uplink transmission component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The configuration reception component 525 may be configured as or otherwise support a means for receiving from a base station a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode. The downlink reception component 530 may be configured as or otherwise support a means for receiving downlink transmissions from the base station according to the second regulation operating mode. The uplink transmission component 535 may be configured as or otherwise support a means for performing uplink transmissions to the base station according to the first regulation operating mode.

Figure 6:
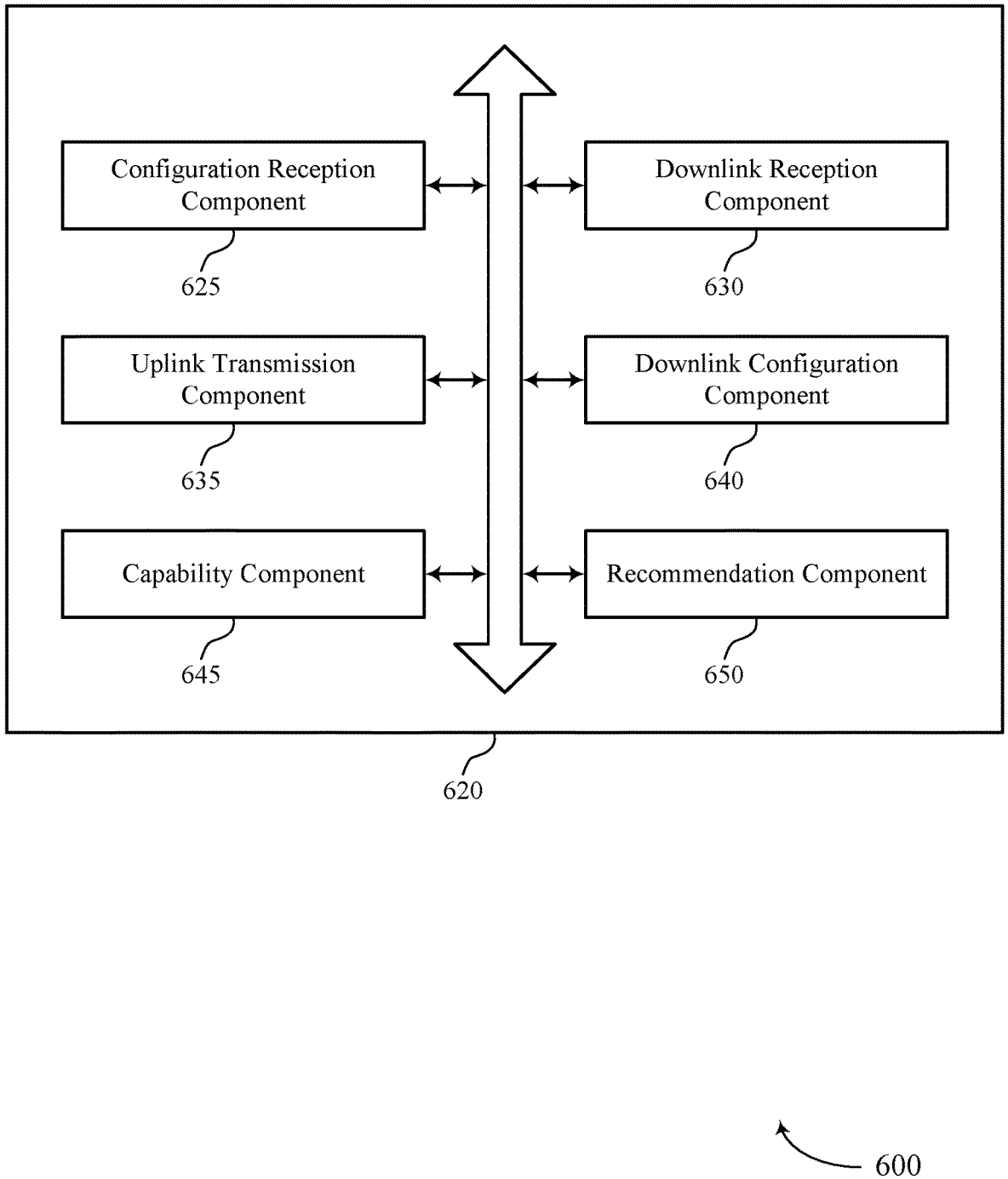
FIG. 6 shows a block diagram of a communications manager that supports mixed mode operation in low power frequency hopping in accordance with aspects of the present disclosure.

FIG. 6 shows a block diagram 600 of a communications manager 620 that supports mixed mode operation in low power frequency hopping in accordance with aspects of the present disclosure. The communications manager 620 may be an example of aspects of a communications manager 420, a communications manager 520, or both, as described herein. The communications manager 620, or various components thereof, may be an example of means for performing various aspects of mixed mode operation in low power frequency hopping as described herein. For example, the communications manager 620 may include a configuration reception component 625, a downlink reception component 630, an uplink transmission component 635, a downlink configuration component 640, a capability component 645, a recommendation component 650, or any combination thereof. Each of these components may communicate, directly or indirectly, with one another (e.g., via one or more buses).

The communications manager 620 may support wireless communication at a UE in accordance with examples as disclosed herein. The configuration reception component 625 may be configured as or otherwise support a means for receiving from a base station a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode. The downlink reception component 630 may be configured as or otherwise support a means for receiving downlink transmissions from the base station according to the second regulation operating mode. The uplink transmission component 635 may be configured as or otherwise support a means for performing uplink transmissions to the base station according to the first regulation operating mode.

In some examples, the downlink configuration component 640 may be configured as or otherwise support a means for receiving signaling advertising the second regulation operating mode of the base station, the second regulation operating mode associated with one or more of a second transmit power constraint, a second frequency hopping setting, or a second listen-before-talk setting.

In some examples, the uplink transmission component 635 may be configured as or otherwise support a means for using a default regulation operating mode to transmit to the base station prior to receiving the configuration of the first regulation operating mode for the UE, where the default regulation operating mode is different from the first regulation operating mode.

In some examples, frequency hopping is enabled for the default regulation operating mode.

In some examples, the capability component 645 may be configured as or otherwise support a means for transmitting signaling indicating a listen-before-talk capability of the UE to the base station, where receiving the configuration of the first regulation operating mode for the UE is based on the listen-before-talk capability of the UE.

In some examples, to support transmitting the signaling indicating the listen-before-talk capability of the UE, the capability component 645 may be configured as or otherwise support a means for transmitting a RRC message including the listen-before-talk capability of the UE following a RRC connection setup procedure between the base station and the UE.

In some examples, to support transmitting the signaling indicating the listen-before-talk capability of the UE, the capability component 645 may be configured as or otherwise support a means for transmitting a random access preamble to the base station in connection with a random access procedure, where the listen-before-talk capability of the UE is indicated by one or more of: a sequence of the random access preamble or a random access channel opportunity used to transmit the random access preamble.

In some examples, the recommendation component 650 may be configured as or otherwise support a means for transmitting a recommendation for the first regulation operating mode to the base station, where receiving the configuration of the first regulation operating mode for the UE is in response to the recommendation or request.

In some examples, to support receiving the downlink transmissions from the base station according to the second regulation operating mode, the downlink reception component 630 may be configured as or otherwise support a means for receiving the downlink transmissions using a first band that is wider than a second band used to transmit the uplink transmissions.

In some examples, to support performing the uplink transmissions to the base station according to the first regulation operating mode, the uplink transmission component 635 may be configured as or otherwise support a means for selectively enabling or disabling frequency hopping based on the configuration of the first regulation operating mode.

In some examples, to support performing the uplink transmissions to the base station according to the first regulation operating mode, the uplink transmission component 635 may be configured as or otherwise support a means for using frequency hopping for the uplink transmissions while frequency hopping is disabled for the downlink transmissions.

In some examples, the second regulation operating mode includes a LPI mode, and the first regulation operating mode comprises one or more of the LPI mode or a VLP mode with frequency hopping.

In some examples, the second regulation operating mode includes a VLP mode without frequency hopping and the first regulation operating mode includes a VLP mode with frequency hopping.

Figure 7:
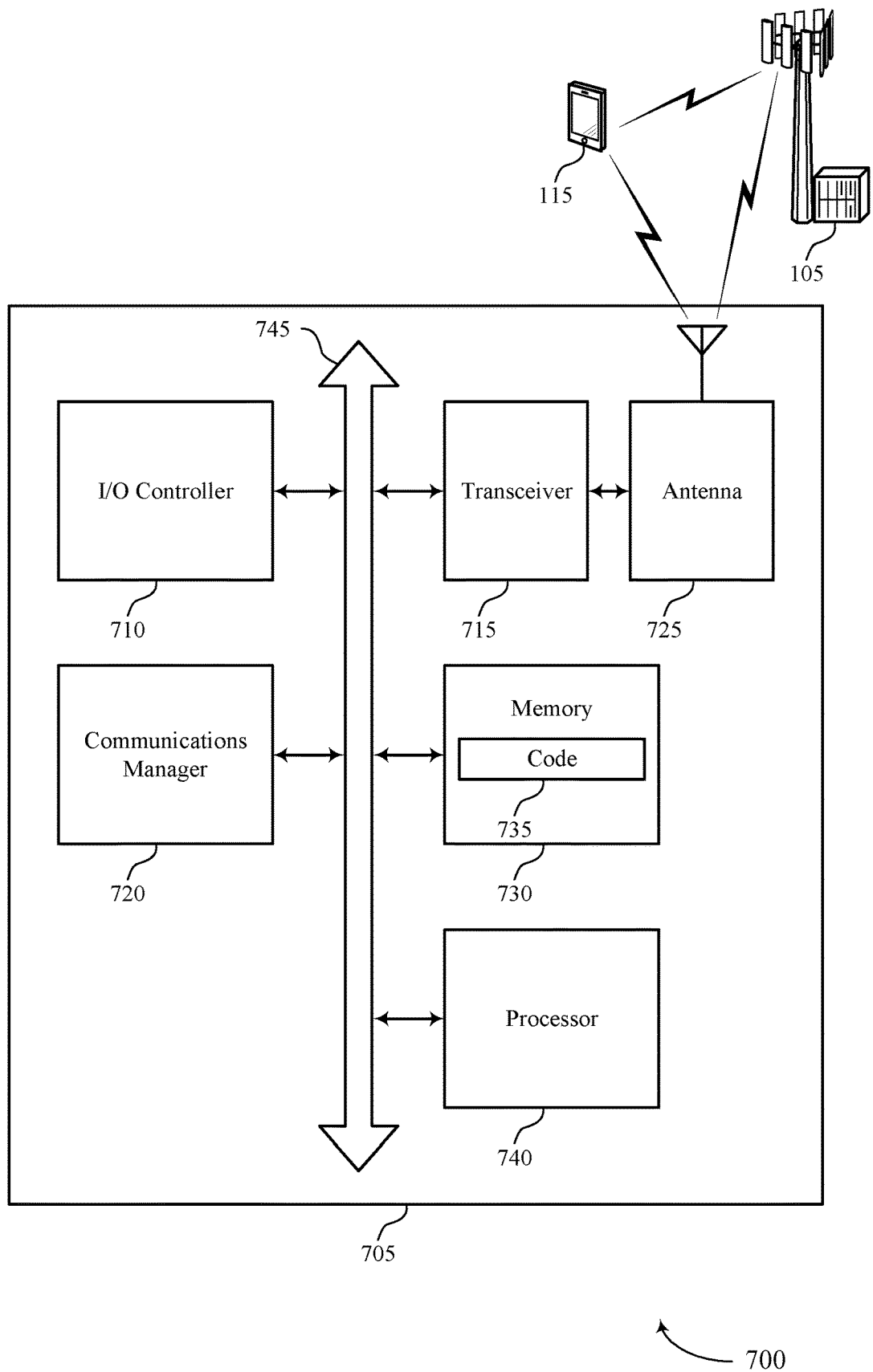
FIG. 7 shows a diagram of a system including a device that supports mixed mode operation in low power frequency hopping in accordance with aspects of the present disclosure.

FIG. 7 shows a diagram of a system 700 including a device 705 that supports mixed mode operation in low power frequency hopping in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting mixed mode operation in low power frequency hopping). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving from a base station a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode. The communications manager 720 may be configured as or otherwise support a means for receiving downlink transmissions from the base station according to the second regulation operating mode. The communications manager 720 may be configured as or otherwise support a means for performing uplink transmissions to the base station according to the first regulation operating mode.

By including or configuring the communications manager 720 in accordance with examples as described herein, the device 705 may support techniques for efficient low power communications operations between devices. Device 705 may efficiently communicate with other devices, including other low power devices, based on a mixed mode operation. The mixed mode operation may provide versatility in communications, and decrease latency.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of mixed mode operation in low power frequency hopping as described herein, or the processor 740 and the memory 730 may be otherwise configured to perform or support such operations.

Figure 8:
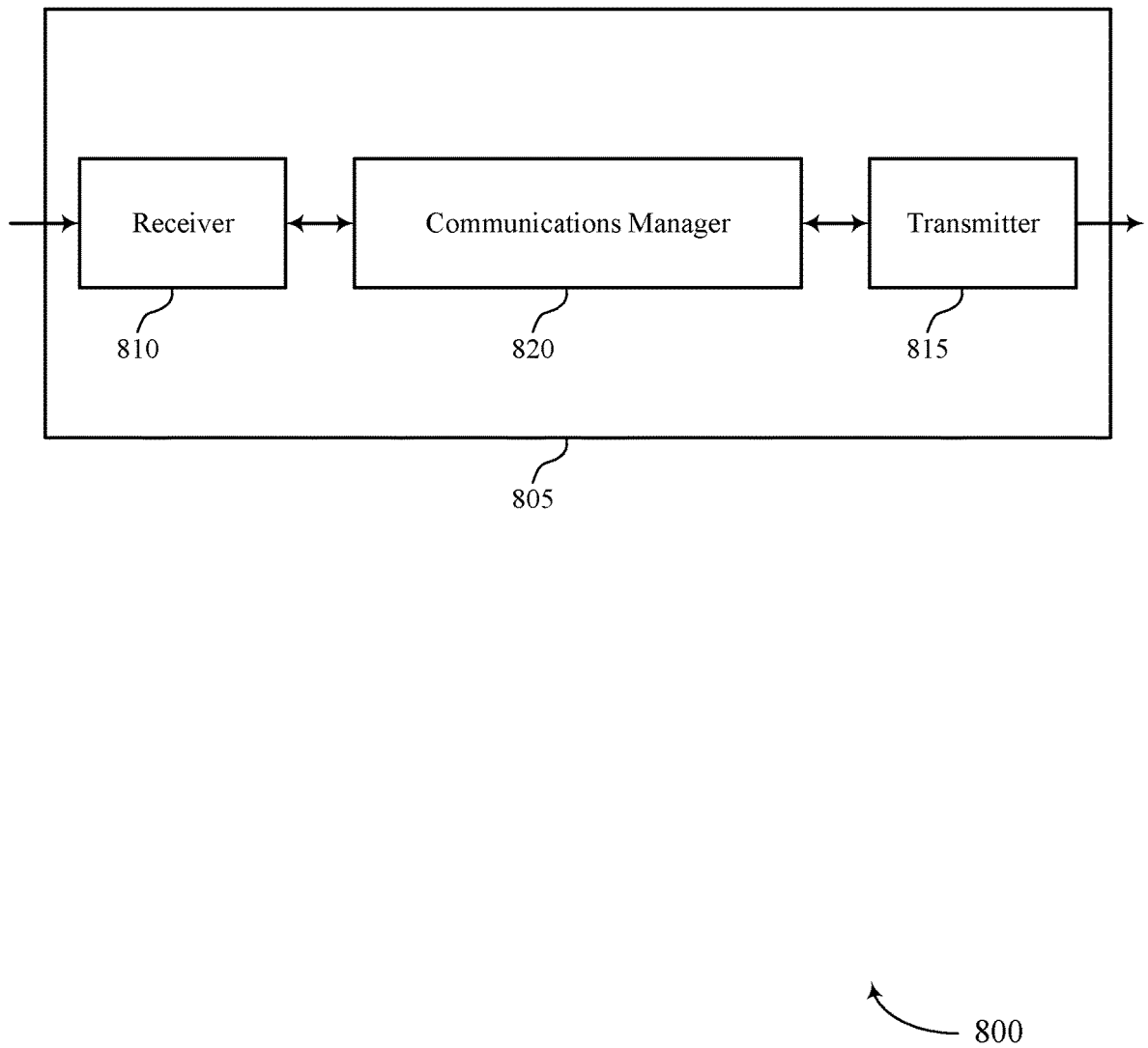
FIGS. 8 and 9 show block diagrams of devices that support mixed mode operation in low power frequency hopping in accordance with aspects of the present disclosure.

FIG. 8 shows a block diagram 800 of a device 805 that supports mixed mode operation in low power frequency hopping in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to mixed mode operation in low power frequency hopping). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to mixed mode operation in low power frequency hopping). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of mixed mode operation in low power frequency hopping as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode. The communications manager 820 may be configured as or otherwise support a means for transmitting downlink transmissions to the UE according to the second regulation operating mode. The communications manager 820 may be configured as or otherwise support a means for receiving uplink transmissions from the UE according to the first regulation operating mode.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for efficient communications between low power devices. The devices may also decrease power consumption due to the increase communications efficiency associated with the mixed mode operations described herein.

Figure 9:
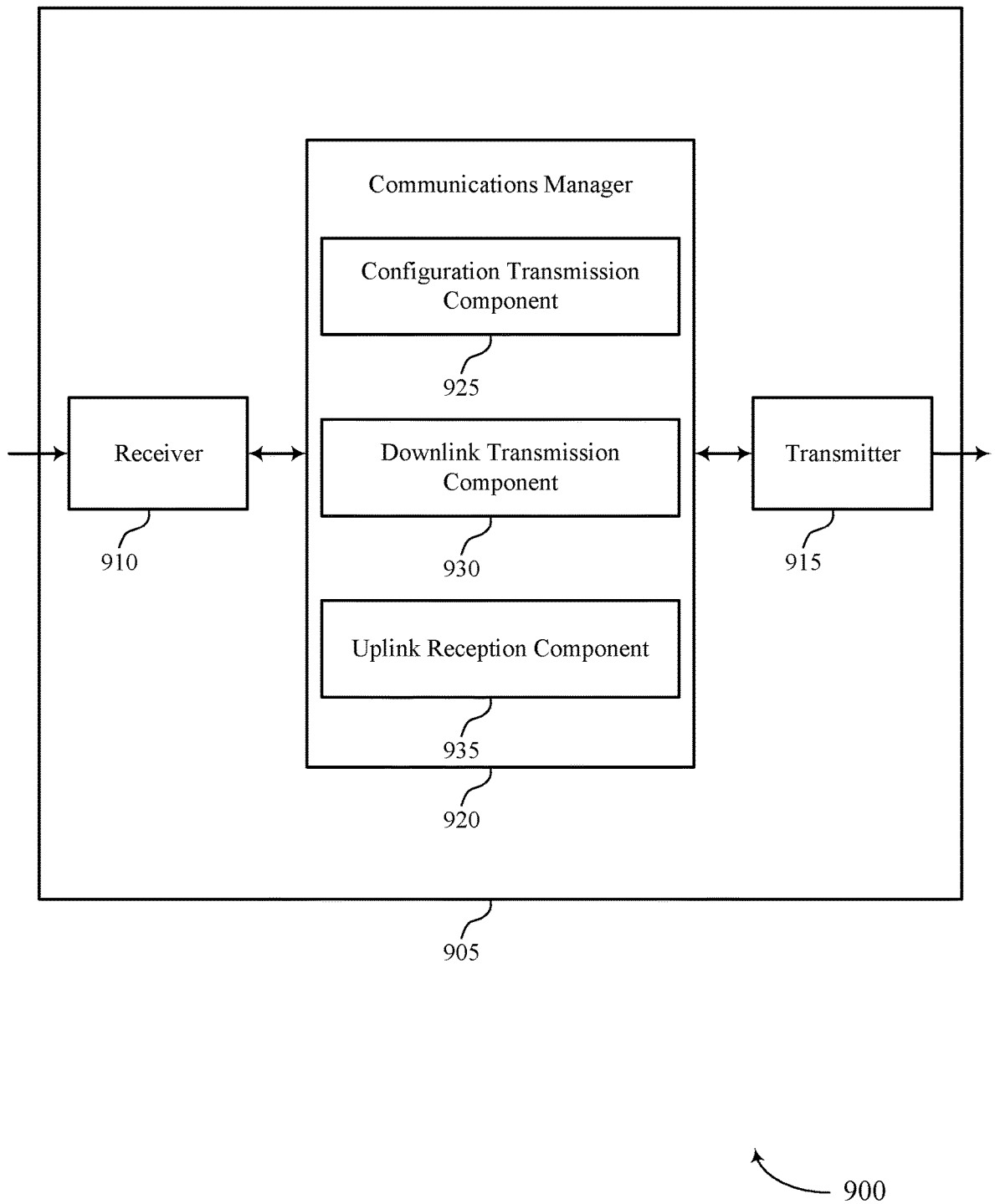

FIG. 9 shows a block diagram 900 of a device 905 that supports mixed mode operation in low power frequency hopping in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to mixed mode operation in low power frequency hopping). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to mixed mode operation in low power frequency hopping). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of mixed mode operation in low power frequency hopping as described herein. For example, the communications manager 920 may include a configuration transmission component 925, a downlink transmission component 930, an uplink reception component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The configuration transmission component 925 may be configured as or otherwise support a means for transmitting, to a UE a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode. The downlink transmission component 930 may be configured as or otherwise support a means for transmitting downlink transmissions to the UE according to the second regulation operating mode. The uplink reception component 935 may be configured as or otherwise support a means for receiving uplink transmissions from the UE according to the first regulation operating mode.

Figure 10:
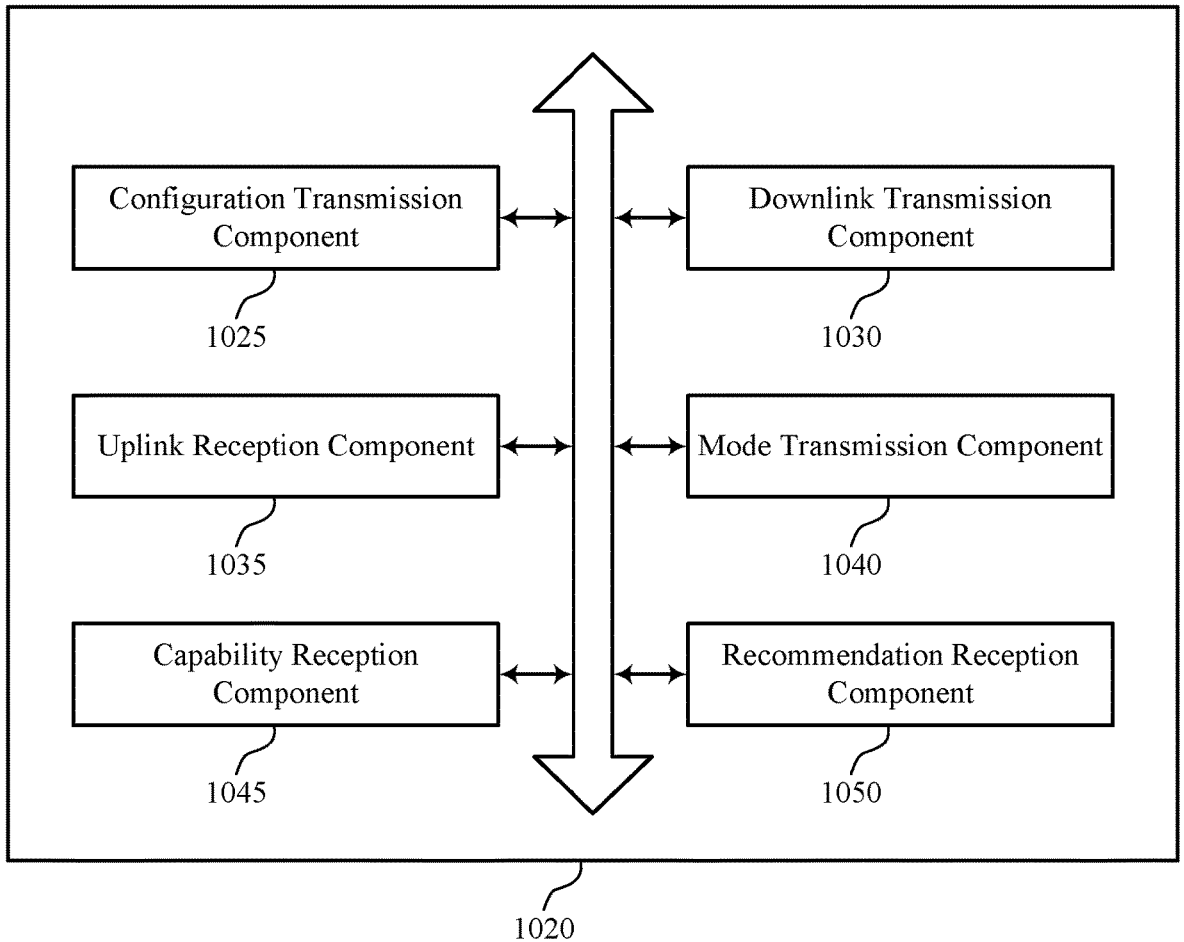
FIG. 10 shows a block diagram of a communications manager that supports mixed mode operation in low power frequency hopping in accordance with aspects of the present disclosure.

FIG. 10 shows a block diagram 1000 of a communications manager 1020 that supports mixed mode operation in low power frequency hopping in accordance with aspects of the present disclosure. The communications manager 1020 may be an example of aspects of a communications manager 820, a communications manager 920, or both, as described herein. The communications manager 1020, or various components thereof, may be an example of means for performing various aspects of mixed mode operation in low power frequency hopping as described herein. For example, the communications manager 1020 may include a configuration transmission component 1025, a downlink transmission component 1030, an uplink reception component 1035, a mode transmission component 1040, a capability reception component 1045, a recommendation reception component 1050, or any combination thereof. Each of these components may communicate, directly or indirectly, with one another (e.g., via one or more buses).

The communications manager 1020 may support wireless communication at a base station in accordance with examples as disclosed herein. The configuration transmission component 1025 may be configured as or otherwise support a means for transmitting, to a UE a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode. The downlink transmission component 1030 may be configured as or otherwise support a means for transmitting downlink transmissions to the UE according to the second regulation operating mode. The uplink reception component 1035 may be configured as or otherwise support a means for receiving uplink transmissions from the UE according to the first regulation operating mode.

In some examples, the mode transmission component 1040 may be configured as or otherwise support a means for transmitting signaling advertising the second regulation operating mode of the base station, the second regulation operating mode associated with one or more of a second transmit power constraint, a second frequency hopping setting, or a second listen-before-talk setting.

In some examples, the uplink reception component 1035 may be configured as or otherwise support a means for receiving transmissions from the UE according to a default regulation operating mode prior to transmitting the configuration of the first regulation operating mode to the UE, where the default regulation operating mode is different from the first regulation operating mode.

In some examples, frequency hopping is enabled for the default regulation operating mode.

In some examples, the capability reception component 1045 may be configured as or otherwise support a means for receiving, from the UE, signaling indicating a listen-before-talk capability of the UE, where transmitting the configuration of the first regulation operating mode for the UE is based on the listen-before-talk capability of the UE.

In some examples, to support receiving the signaling indicating the listen-before-talk capability of the UE, the capability reception component 1045 may be configured as or otherwise support a means for receiving a RRC message including the listen-before-talk capability of the UE following a RRC connection setup procedure between the base station and the UE.

In some examples, to support receiving the signaling indicating the listen-before-talk capability of the UE, the capability reception component 1045 may be configured as or otherwise support a means for receiving a random access preamble from the UE in connection with a random access procedure, where the listen-before-talk capability of the UE is indicated by one or more of: a sequence of the random access preamble or a random access channel opportunity used to transmit the random access preamble.

In some examples, the recommendation reception component 1050 may be configured as or otherwise support a means for receiving a recommendation for the first regulation operating mode from the UE, where transmitting the configuration of the first regulation operating mode for the UE is in response to the recommendation or request.

In some examples, to support transmitting the downlink transmissions to the UE according to the second regulation operating mode, the downlink transmission component 1030 may be configured as or otherwise support a means for transmitting the downlink transmissions using a first band that is wider than a second band used to transmit the uplink transmissions.

In some examples, to support receiving the uplink transmissions from the UE according to the first regulation operating mode, the uplink reception component 1035 may be configured as or otherwise support a means for selectively enabling or disabling frequency hopping based on the configuration of the first regulation operating mode.

In some examples, to support receiving the uplink transmissions from the UE according to the first regulation operating mode, the uplink reception component 1035 may be configured as or otherwise support a means for using frequency hopping to receive the uplink transmissions while frequency hopping is disabled for the downlink transmissions.

In some examples, the configuration transmission component 1025 may be configured as or otherwise support a means for transmitting, to a second UE a configuration of a third regulation operating mode for the UE, the third regulation operating mode associated with a third transmit power constraint, a third frequency hopping setting, and a third listen-before-talk setting, where the third regulation operating mode is different from the first regulation operating mode and the second regulation operating mode.

In some examples, the second regulation operating mode comprises a LPI mode, and the first regulation operating mode comprises one or more of the LPI mode or a VLP mode with frequency hopping.

In some examples, the second regulation operating mode includes a VLP mode without frequency hopping and the first regulation operating mode includes a VLP mode with frequency hopping.

Figure 11:
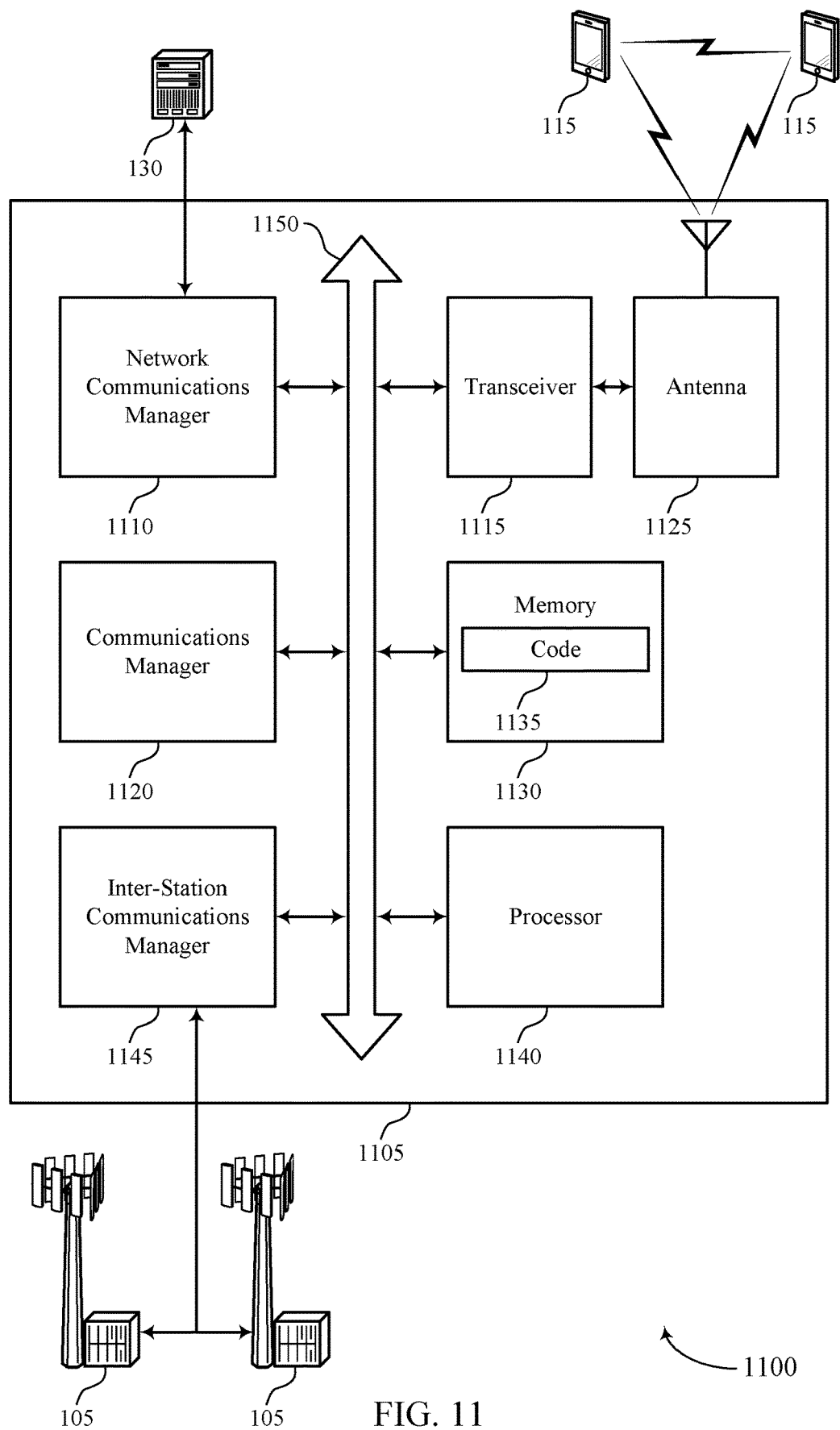
FIG. 11 shows a diagram of a system including a device that supports mixed mode operation in low power frequency hopping in accordance with aspects of the present disclosure.

FIG. 11 shows a diagram of a system 1100 including a device 1105 that supports mixed mode operation in low power frequency hopping in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting mixed mode operation in low power frequency hopping). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode. The communications manager 1120 may be configured as or otherwise support a means for transmitting downlink transmissions to the UE according to the second regulation operating mode. The communications manager 1120 may be configured as or otherwise support a means for receiving uplink transmissions from the UE according to the first regulation operating mode.

By including or configuring the communications manager 1120 in accordance with examples as described herein, the device 1105 may support techniques for increased communications efficiency between low power devices. Devices, including device 1105, operating in low power modes, may efficiently communicate in a mixed mode operation system. The mixed mode operation system may also decrease more consumption, by providing increased efficiency in devices able to operate in low power modes.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of mixed mode operation in low power frequency hopping as described herein, or the processor 1140 and the memory 1130 may be otherwise configured to perform or support such operations.

Figure 12:
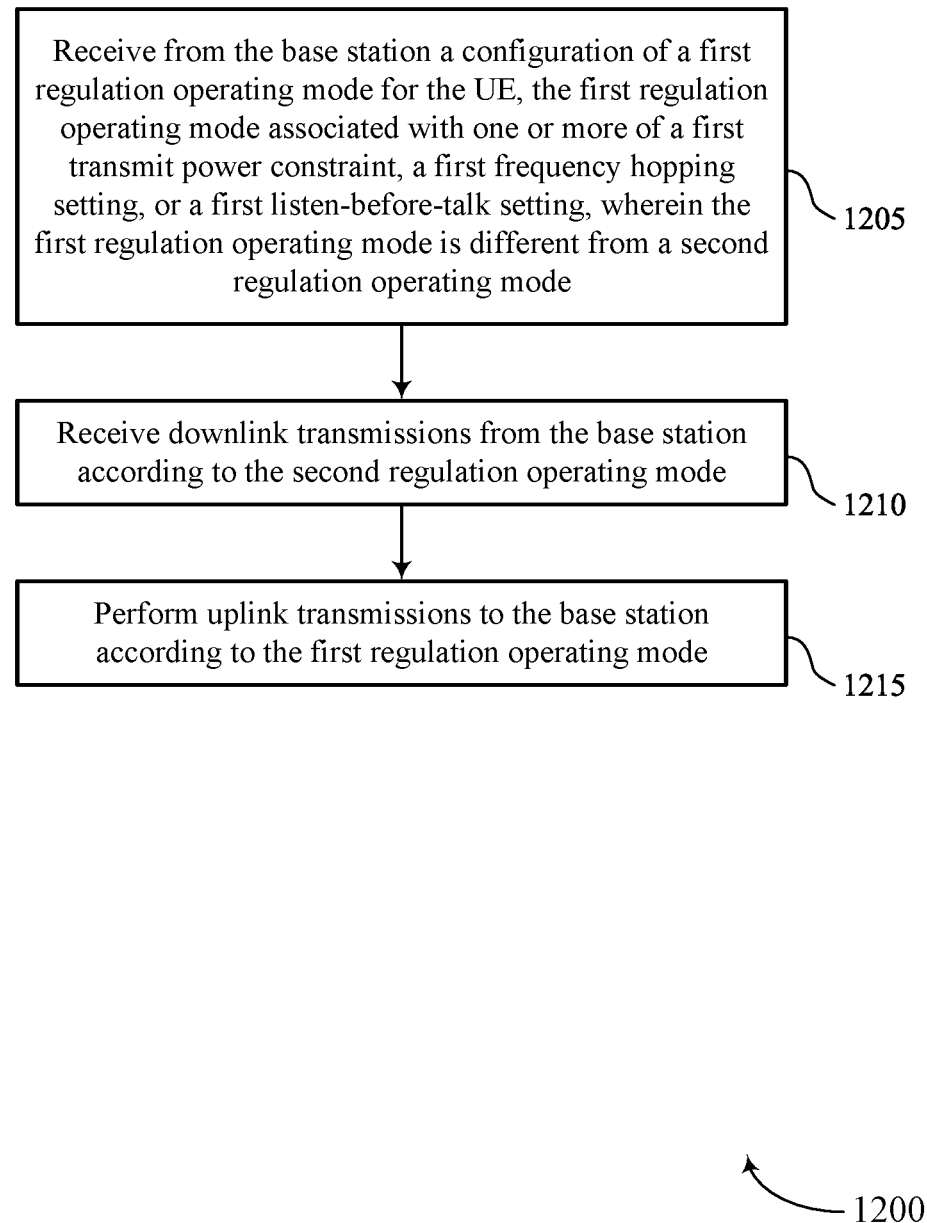
FIGS. 12 through 15 show flowcharts illustrating methods that support mixed mode operation in low power frequency hopping in accordance with aspects of the present disclosure.

FIG. 12 shows a flowchart illustrating a method 1200 that supports mixed mode operation in low power frequency hopping in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving from a base station a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode. The operations of 1205 may be performed in accordance with examples as disclosed herein. In some examples, aspects of the operations of 1205 may be performed by a configuration reception component 625 as described with reference to FIG. 6.

At 1210, the method may include receiving downlink transmissions from the base station according to the second regulation operating mode. The operations of 1210 may be performed in accordance with examples as disclosed herein. In some examples, aspects of the operations of 1210 may be performed by a downlink reception component 630 as described with reference to FIG. 6.

At 1215, the method may include performing uplink transmissions to the base station according to the first regulation operating mode. The operations of 1215 may be performed in accordance with examples as disclosed herein. In some examples, aspects of the operations of 1215 may be performed by an uplink transmission component 635 as described with reference to FIG. 6.

Figure 13:
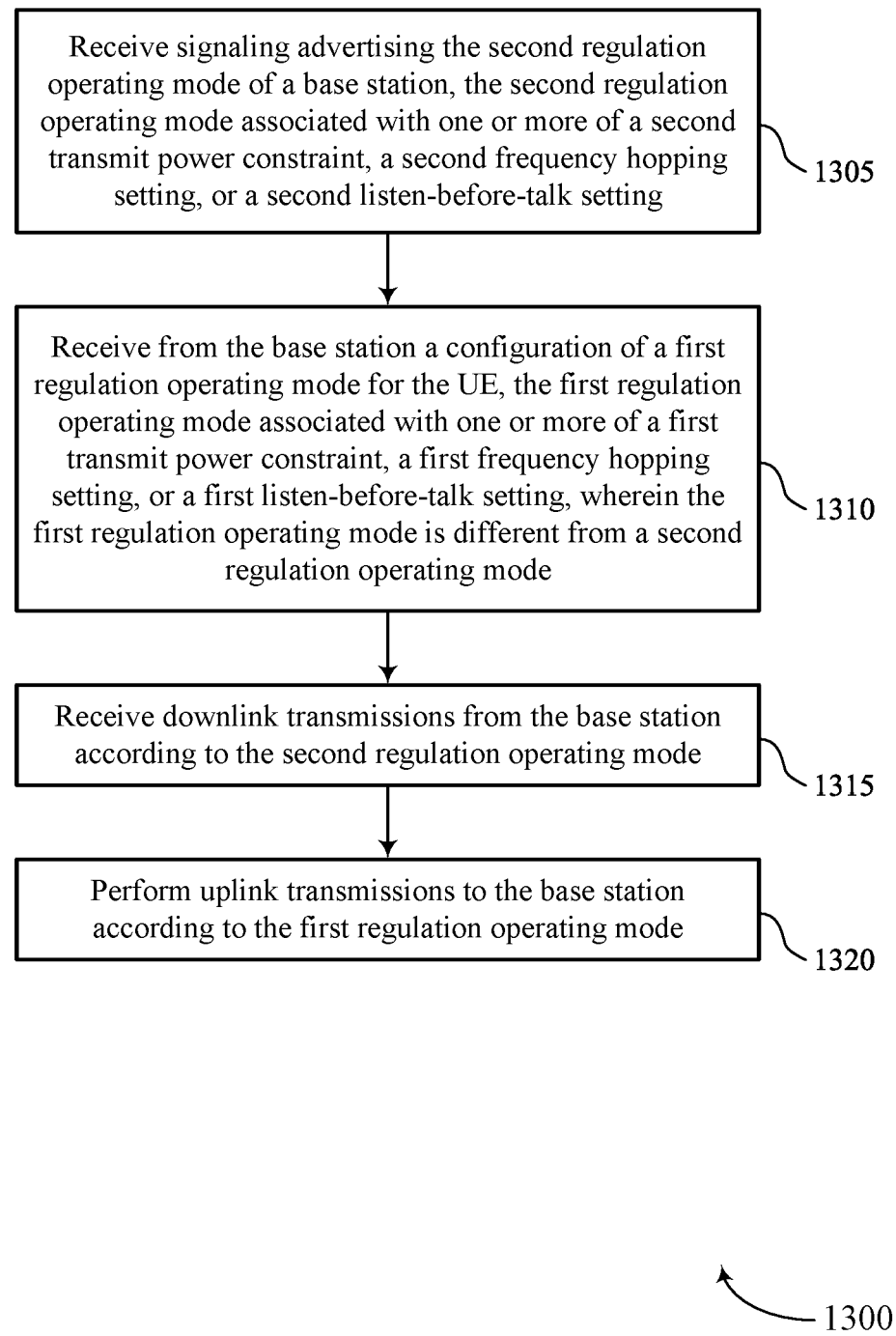

FIG. 13 shows a flowchart illustrating a method 1300 that supports mixed mode operation in low power frequency hopping in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving signaling advertising the second regulation operating mode of the base station, the second regulation operating mode associated with one or more of a second transmit power constraint, a second frequency hopping setting, or a second listen-before-talk setting. The operations of 1305 may be performed in accordance with examples as disclosed herein. In some examples, aspects of the operations of 1305 may be performed by a downlink configuration component 640 as described with reference to FIG. 6.

At 1310, the method may include receiving from a base station a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode. The operations of 1310 may be performed in accordance with examples as disclosed herein. In some examples, aspects of the operations of 1310 may be performed by a configuration reception component 625 as described with reference to FIG. 6.

At 1315, the method may include receiving downlink transmissions from the base station according to the second regulation operating mode. The operations of 1315 may be performed in accordance with examples as disclosed herein. In some examples, aspects of the operations of 1315 may be performed by a downlink reception component 630 as described with reference to FIG. 6.

At 1320, the method may include performing uplink transmissions to the base station according to the first regulation operating mode. The operations of 1320 may be performed in accordance with examples as disclosed herein. In some examples, aspects of the operations of 1320 may be performed by an uplink transmission component 635 as described with reference to FIG. 6.

Figure 14:
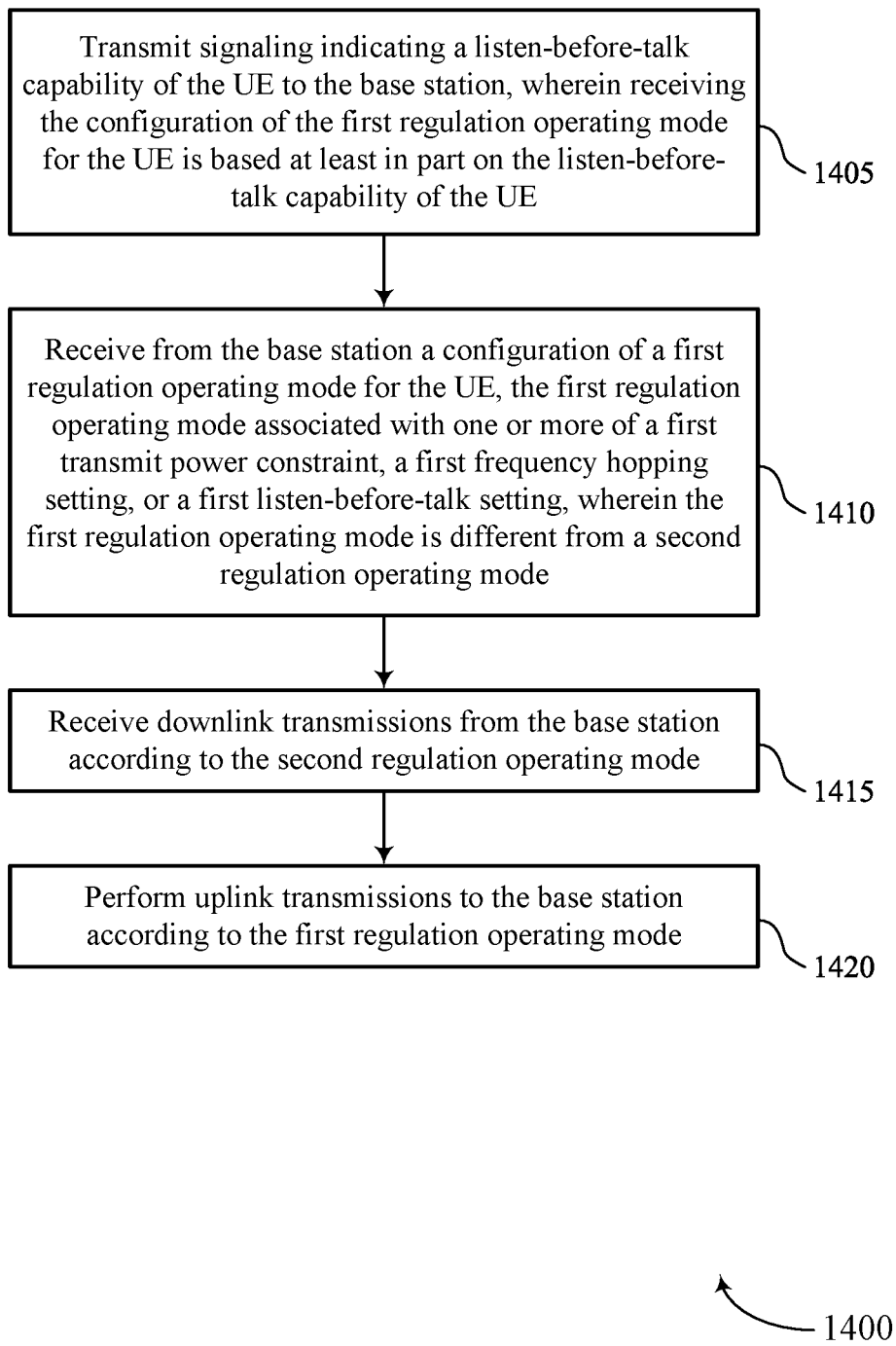

FIG. 14 shows a flowchart illustrating a method 1400 that supports mixed mode operation in low power frequency hopping in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include transmitting signaling indicating a listen-before-talk capability of the UE to the base station, where receiving the configuration of the first regulation operating mode for the UE is based on the listen-before-talk capability of the UE. The operations of 1405 may be performed in accordance with examples as disclosed herein. In some examples, aspects of the operations of 1405 may be performed by a capability component 645 as described with reference to FIG. 6.

At 1410, the method may include receiving from a base station a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode. The operations of 1410 may be performed in accordance with examples as disclosed herein. In some examples, aspects of the operations of 1410 may be performed by a configuration reception component 625 as described with reference to FIG. 6.

At 1415, the method may include receiving downlink transmissions from the base station according to the second regulation operating mode. The operations of 1415 may be performed in accordance with examples as disclosed herein. In some examples, aspects of the operations of 1415 may be performed by a downlink reception component 630 as described with reference to FIG. 6.

At 1420, the method may include performing uplink transmissions to the base station according to the first regulation operating mode. The operations of 1420 may be performed in accordance with examples as disclosed herein. In some examples, aspects of the operations of 1420 may be performed by an uplink transmission component 635 as described with reference to FIG. 6.

Figure 15:
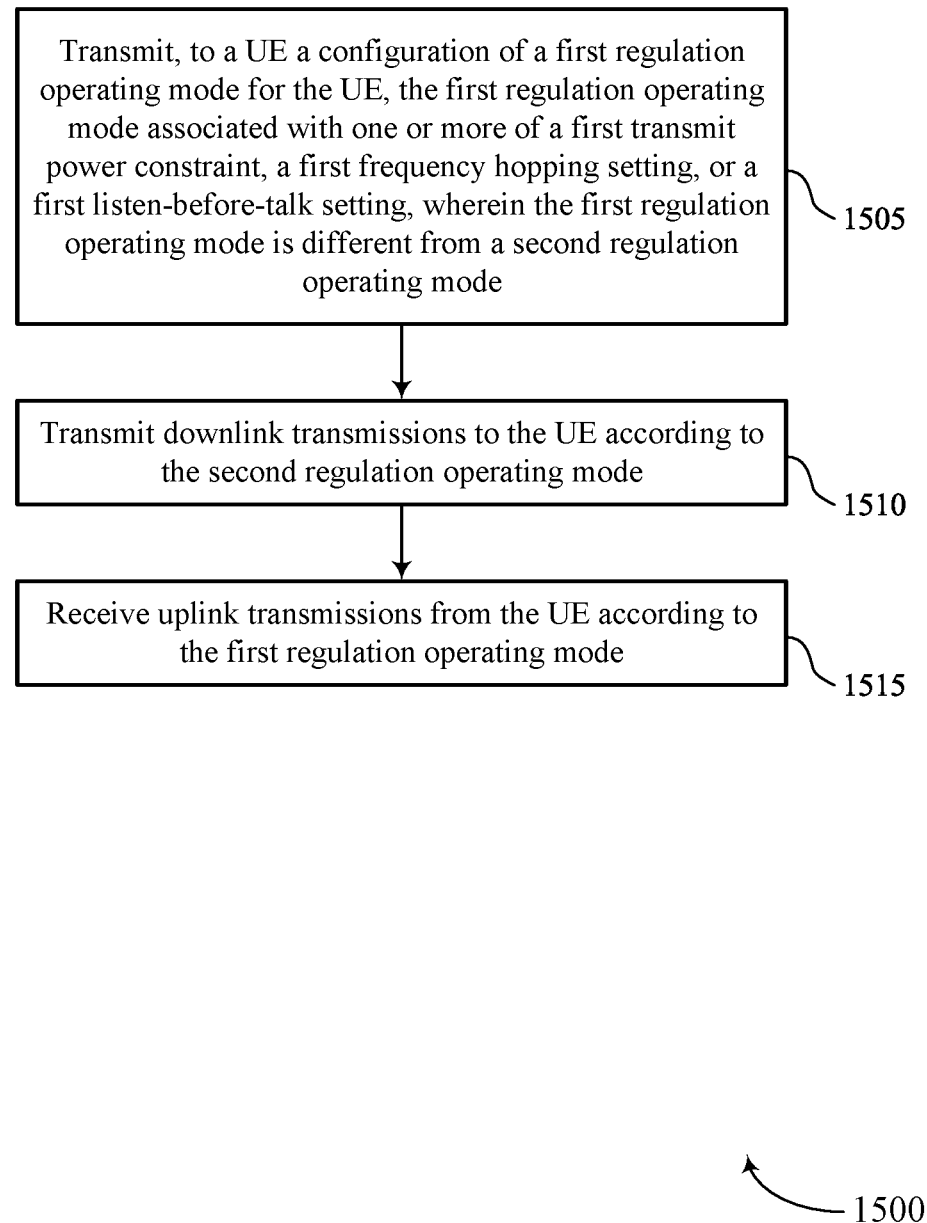

FIG. 15 shows a flowchart illustrating a method 1500 that supports mixed mode operation in low power frequency hopping in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE a configuration of a first regulation operating mode for the UE, the first regulation operating mode associated with one or more of a first transmit power constraint, a first frequency hopping setting, or a first listen-before-talk setting, where the first regulation operating mode is different from a second regulation operating mode. The operations of 1505 may be performed in accordance with examples as disclosed herein. In some examples, aspects of the operations of 1505 may be performed by a configuration transmission component 1025 as described with reference to FIG. 10.

At 1510, the method may include transmitting downlink transmissions to the UE according to the second regulation operating mode. The operations of 1510 may be performed in accordance with examples as disclosed herein. In some examples, aspects of the operations of 1510 may be performed by a downlink transmission component 1030 as described with reference to FIG. 10.

At 1515, the method may include receiving uplink transmissions from the UE according to the first regulation operating mode. The operations of 1515 may be performed in accordance with examples as disclosed herein. In some examples, aspects of the operations of 1515 may be performed by an uplink reception component 1035 as described with reference to FIG. 10.

The following provides an overview of aspects of the present disclosure:

Aspect 1: A method for wireless communication at a UE, comprising: receiving from the base station a configuration of a first regulation operating mode for the UE, the first regulation operating mode associated with one or more of a first transmit power constraint, a first frequency hopping setting, or a first listen-before-talk setting, wherein the first regulation operating mode is different from a second regulation operating mode; receiving downlink transmissions from the base station according to the second regulation operating mode; and performing uplink transmissions to the base station according to the first regulation operating mode.

Aspect 2: The method of aspect 1, further comprising: receiving signaling advertising the second regulation operating mode of a base station, the second regulation operating mode associated with one or more of a second transmit power constraint, a second frequency hopping setting, or a second listen-before-talk setting.

Aspect 3: The method of any of aspects 1 through 2, further comprising: using a default regulation operating mode to transmit to the base station prior to receiving the configuration of the first regulation operating mode for the UE, wherein the default regulation operating mode is different from the first regulation operating mode.

Aspect 4: The method of aspect 3, wherein frequency hopping is enabled for the default regulation operating mode.

Aspect 5: The method of any of aspects 1 through 4, further comprising: transmitting signaling indicating a listen-before-talk capability of the UE to the base station, wherein receiving the configuration of the first regulation operating mode for the UE is based at least in part on the listen-before-talk capability of the UE.

Aspect 6: The method of aspect 5, wherein transmitting the signaling indicating the listen-before-talk capability of the UE comprises: transmitting a RRC message comprising the listen-before-talk capability of the UE following a RRC connection setup procedure between the base station and the UE.

Aspect 7: The method of any of aspects 5 through 6, wherein transmitting the signaling indicating the listen-before-talk capability of the UE comprises: transmitting a random access preamble to the base station in connection with a random access procedure, wherein the listen-before-talk capability of the UE is indicated by one or more of: a sequence of the random access preamble or a random access channel opportunity used to transmit the random access preamble.

Aspect 8: The method of any of aspects 1 through 7, further comprising: transmitting a recommendation for the first regulation operating mode to the base station, wherein receiving the configuration of the first regulation operating mode for the UE is in response to the recommendation or request.

Aspect 9: The method of any of aspects 1 through 8, wherein receiving the downlink transmissions from the base station according to the second regulation operating mode comprises: receiving the downlink transmissions using a first band that is wider than a second band used to transmit the uplink transmissions.

Aspect 10: The method of any of aspects 1 through 9, wherein performing the uplink transmissions to the base station according to the first regulation operating mode comprises: selectively enabling or disabling frequency hopping based at least in part on the configuration of the first regulation operating mode.

Aspect 11: The method of any of aspects 1 through 10, wherein performing the uplink transmissions to the base station according to the first regulation operating mode comprises: using frequency hopping for the uplink transmissions while frequency hopping is disabled for the downlink transmissions.

Aspect 12: The method of any of aspects 1 through 11, wherein the second regulation operating mode comprises a LPI mode, and the first regulation operating mode comprises one or more of: the LPI mode or a VLP mode with frequency hopping.

Aspect 13: The method of any of aspects 1 through 12, wherein the second regulation operating mode comprises a VLP mode without frequency hopping and the first regulation operating mode comprises a VLP mode with frequency hopping.

Aspect 14: A method for wireless communication at a base station, comprising: transmitting, to a UE a configuration of a first regulation operating mode for the UE, the first regulation operating mode associated with one or more of a first transmit power constraint, a first frequency hopping setting, or a first listen-before-talk setting, wherein the first regulation operating mode is different from a second regulation operating mode; transmitting downlink transmissions to the UE according to the second regulation operating mode; and receiving uplink transmissions from the UE according to the first regulation operating mode.

Aspect 15: The method of aspect 14, further comprising: transmitting signaling advertising the second regulation operating mode of the base station, the second regulation operating mode associated with one or more of a second transmit power constraint, a second frequency hopping setting, or a second listen-before-talk setting.

Aspect 16: The method of any of aspects 14 through 15, further comprising: receiving transmissions from the UE according to a default regulation operating mode prior to transmitting the configuration of the first regulation operating mode to the UE, wherein the default regulation operating mode is different from the first regulation operating mode.

Aspect 17: The method of aspect 16, wherein frequency hopping is enabled for the default regulation operating mode.

Aspect 18: The method of any of aspects 14 through 17, further comprising: receiving, from the UE, signaling indicating a listen-before-talk capability of the UE, wherein transmitting the configuration of the first regulation operating mode for the UE is based at least in part on the listen-before-talk capability of the UE.

Aspect 19: The method of aspect 18, wherein receiving the signaling indicating the listen-before-talk capability of the UE comprises: receiving a RRC message comprising the listen-before-talk capability of the UE following a RRC connection setup procedure between the base station and the UE.

Aspect 20: The method of any of aspects 18 through 19, wherein receiving the signaling indicating the listen-before-talk capability of the UE comprises: receiving a random access preamble from the UE in connection with a random access procedure, wherein the listen-before-talk capability of the UE is indicated by one or more of: a sequence of the random access preamble or a random access channel opportunity used to transmit the random access preamble.

Aspect 21: The method of any of aspects 14 through 20, further comprising: receiving a recommendation for the first regulation operating mode from the UE, wherein transmitting the configuration of the first regulation operating mode for the UE is in response to the recommendation or request.

Aspect 22: The method of any of aspects 14 through 21, wherein transmitting the downlink transmissions to the UE according to the second regulation operating mode comprises: transmitting the downlink transmissions using a first band that is wider than a second band used to transmit the uplink transmissions.

Aspect 23: The method of any of aspects 14 through 22, wherein receiving the uplink transmissions from the UE according to the first regulation operating mode comprises: selectively enabling or disabling frequency hopping based at least in part on the configuration of the first regulation operating mode.

Aspect 24: The method of any of aspects 14 through 23, wherein receiving the uplink transmissions from the UE according to the first regulation operating mode comprises: using frequency hopping to receive the uplink transmissions while frequency hopping is disabled for the downlink transmissions.

Aspect 25: The method of any of aspects 14 through 24, further comprising: transmitting, to a second UE a configuration of a third regulation operating mode for the UE, the third regulation operating mode associated with a third transmit power constraint, a third frequency hopping setting, and a third listen-before-talk setting, wherein the third regulation operating mode is different from the first regulation operating mode and the second regulation operating mode.

Aspect 26: The method of any of aspects 14 through 25, wherein the second regulation operating mode comprises a LPI mode, and the first regulation operating mode comprises one or more of: the LPI mode or a VLP mode with frequency hopping.

Aspect 27: The method of any of aspects 14 through 26, wherein the second regulation operating mode comprises a VLP mode without frequency hopping and the first regulation operating mode comprises a VLP mode with frequency hopping.

Aspect 28: An apparatus for wireless communication at a UE, comprising a processor; memory coupled with the processor; and instructions stored in the memory and executable by the processor to cause the apparatus to perform a method of any of aspects 1 through 13.

Aspect 29: An apparatus for wireless communication at a UE, comprising at least one means for performing a method of any of aspects 1 through 13.

Aspect 30: A non-transitory computer-readable medium storing code for wireless communication at a UE, the code comprising instructions executable by a processor to perform a method of any of aspects 1 through 13.

Aspect 31: An apparatus for wireless communication at a base station, comprising a processor; memory coupled with the processor; and instructions stored in the memory and executable by the processor to cause the apparatus to perform a method of any of aspects 14 through 27.

Aspect 32: An apparatus for wireless communication at a base station, comprising at least one means for performing a method of any of aspects 14 through 27.

Aspect 33: A non-transitory computer-readable medium storing code for wireless communication at a base station, the code comprising instructions executable by a processor to perform a method of any of aspects 14 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a network node, a configuration of a first regulation operating mode for the UE, the first regulation operating mode corresponding to a defined low power indoor (LPI) mode or a defined very low power mode (VLP) and associated with a first transmit power constraint, a first frequency hopping setting, and a first listen-before-talk setting, wherein the first regulation operating mode is different from a second regulation operating mode that corresponds to the defined LPI mode or the defined VLP mode and is associated with a second transmit power constraint, a second frequency hopping setting, and a second listen-before-talk setting;
   receiving downlink transmissions from the network node according to the second regulation operating mode; and
   performing uplink transmissions to the network node according to the first regulation operating mode.

2. The method of claim 1, further comprising:
   receiving signaling advertising the second regulation operating mode of the network node.

3. The method of claim 1, further comprising:
   using a default regulation operating mode to transmit to the network node prior to receiving the configuration of the first regulation operating mode for the UE, wherein the default regulation operating mode is different from the first regulation operating mode.

4. The method of claim 3, wherein frequency hopping is enabled for the default regulation operating mode.

5. The method of claim 1, further comprising:
   transmitting signaling indicating a listen-before-talk capability of the UE to the network node, wherein receiving the configuration of the first regulation operating mode for the UE is based at least in part on the listen-before-talk capability of the UE.

6. The method of claim 5, wherein transmitting the signaling indicating the listen-before-talk capability of the UE comprises:
   transmitting a radio resource control (RRC) message comprising the listen-before-talk capability of the UE following a radio resource control (RRC) connection setup procedure between the network node and the UE.

7. The method of claim 5, wherein transmitting the signaling indicating the listen-before-talk capability of the UE comprises:
   transmitting a random access preamble to the network node in connection with a random access procedure, wherein the listen-before-talk capability of the UE is indicated by one or more of: a sequence of the random access preamble or a random access channel opportunity used to transmit the random access preamble.

8. The method of claim 1, further comprising:
   transmitting a recommendation for the first regulation operating mode to the network node, wherein receiving the configuration of the first regulation operating mode for the UE is in response to the recommendation or request.

9. The method of claim 1, wherein receiving the downlink transmissions from the network node according to the second regulation operating mode comprises:
   receiving the downlink transmissions using a first band that is wider than a second band used to transmit the uplink transmissions.

10. The method of claim 1, wherein performing the uplink transmissions to the network node according to the first regulation operating mode comprises:
    selectively enabling or disabling frequency hopping based at least in part on the configuration of the first regulation operating mode.

11. The method of claim 1, wherein performing the uplink transmissions to the network node according to the first regulation operating mode comprises:
    using frequency hopping for the uplink transmissions while frequency hopping is disabled for the downlink transmissions.

12. The method of claim 1, wherein the second regulation operating mode comprises the defined LPI mode, and the first regulation operating mode comprises one or more of the defined LPI mode or the defined VLP mode with frequency hopping.

13. The method of claim 1, wherein the second regulation operating mode comprises the defined VLP mode without frequency hopping and the first regulation operating mode comprises the defined VLP mode with frequency hopping.

14. A method for wireless communication at a network node, comprising:
    transmitting, to a user equipment (UE), a configuration of a first regulation operating mode for the UE, the first regulation operating mode corresponding to a defined low power indoor (LPI) mode or a defined very low power (VLP) mode and associated with a first transmit power constraint, a first frequency hopping setting, and a first listen-before-talk setting, wherein the first regulation operating mode is different from a second regulation operating mode that corresponds to the defined LPI mode or the defined VLP mode and is associated with a second transmit power constraint, a second frequency hopping setting, and a second listen-before-talk setting;

transmitting downlink transmissions to the UE according to the second regulation operating mode; and
receiving uplink transmissions from the UE according to the first regulation operating mode.

15. The method of claim 14, further comprising:
transmitting signaling advertising the second regulation operating mode of the network node.

16. The method of claim 14, further comprising:
receiving transmissions from the UE according to a default regulation operating mode prior to transmitting the configuration of the first regulation operating mode to the UE, wherein the default regulation operating mode is different from the first regulation operating mode.

17. The method of claim 16, wherein frequency hopping is enabled for the default regulation operating mode.

18. The method of claim 14, further comprising:
receiving, from the UE, signaling indicating a listen-before-talk capability of the UE, wherein transmitting the configuration of the first regulation operating mode for the UE is based at least in part on the listen-before-talk capability of the UE.

19. The method of claim 18, wherein receiving the signaling indicating the listen-before-talk capability of the UE comprises:
receiving a radio resource control (RRC) message comprising the listen-before-talk capability of the UE following a radio resource control (RRC) connection setup procedure between the network node and the UE.

20. The method of claim 18, wherein receiving the signaling indicating the listen-before-talk capability of the UE comprises:
receiving a random access preamble from the UE in connection with a random access procedure, wherein the listen-before-talk capability of the UE is indicated by one or more of: a sequence of the random access preamble or a random access channel opportunity used to transmit the random access preamble.

21. The method of claim 14, further comprising:
receiving a recommendation for the first regulation operating mode from the UE, wherein transmitting the configuration of the first regulation operating mode for the UE is in response to the recommendation or request.

22. The method of claim 14, wherein transmitting the downlink transmissions to the UE according to the second regulation operating mode comprises:
transmitting the downlink transmissions using a first band that is wider than a second band used to transmit the uplink transmissions.

23. The method of claim 14, wherein receiving the uplink transmissions from the UE according to the first regulation operating mode comprises:
selectively enabling or disabling frequency hopping based at least in part on the configuration of the first regulation operating mode.

24. The method of claim 14, wherein receiving the uplink transmissions from the UE according to the first regulation operating mode comprises:
using frequency hopping to receive the uplink transmissions while frequency hopping is disabled for the downlink transmissions.

25. The method of claim 14, further comprising:
transmitting, to a second UE a configuration of a third regulation operating mode for the UE, the third regulation operating mode corresponding to the defined LPI mode or the defined VLP mode and associated with a third transmit power constraint, a third frequency hopping setting, and a third listen-before-talk setting, wherein the third regulation operating mode is different from the first regulation operating mode and the second regulation operating mode.

26. The method of claim 14, wherein the second regulation operating mode comprises the defined LPI mode, and the first regulation operating mode comprises one or more of the defined LPI mode or the defined VLP mode with frequency hopping.

27. The method of claim 14, wherein the second regulation operating mode comprises the defined VLP mode without frequency hopping and the first regulation operating mode comprises the defined VLP mode with frequency hopping.

28. An apparatus for wireless communication at a user equipment (UE), comprising:
one or more memories storing processor-executable code; and
one or more processors coupled with the one or more memories and individually or collectively operable to execute the code to cause the apparatus to:
receive, from a network node, a configuration of a first regulation operating mode for the UE, the first regulation operating mode corresponding to a defined low power indoor (LPI) mode or a defined very low power (VLP) mode and associated with a first transmit power constraint, a first frequency hopping setting, and a first listen-before-talk setting, wherein the first regulation operating mode is different from a second regulation operating mode that corresponds to the defined LPI mode or the defined VLP mode and is associated with a second transmit power constraint, a second frequency hopping setting, and a second listen-before-talk setting;
receive downlink transmissions from the network node according to the second regulation operating mode; and
perform uplink transmissions to the network node according to the first regulation operating mode.

29. The apparatus of claim 28, wherein the one or more processors are individually or collectively further operable to execute the code to cause the apparatus to:
receive signaling advertising the second regulation operating mode of the network node.

30. An apparatus for wireless communication at a network node, comprising:
one or more memories storing processor-executable code; and
one or more processors coupled with the one or more memories and individually or collectively operable to execute the code to cause the apparatus to:
transmit, to a user equipment (UE), a configuration of a first regulation operating mode for the UE, the first regulation operating mode corresponding to a defined low power indoor (LPI) mode or a defined very low power (VLP) mode and associated with a first transmit power constraint, a first frequency hopping setting, and a first listen-before-talk setting, wherein the first regulation operating mode is different from a second regulation operating mode that corresponds to the defined LPI mode or the defined VLP mode and is associated with a second transmit power constraint, a second frequency hopping setting, and a second listen-before-talk setting;
transmit downlink transmissions to the UE according to the second regulation operating mode; and receive uplink transmissions from the UE according to the first regulation operating mode.

* * * * *